(12) United States Patent
Lahr et al.

(10) Patent No.: US 11,004,348 B1
(45) Date of Patent: May 11, 2021

(54) GUIDANCE DEVIATION DERIVATION FROM HIGH ASSURANCE HYBRID POSITION SOLUTION SYSTEM AND METHOD

(71) Applicant: Rockwell Collins, Inc., Cedar Rapids, IA (US)

(72) Inventors: Weston J. Lahr, Sherwood, OR (US); Robert A. Armstrong, Canby, OR (US); Carlo L. Tiana, Portland, OR (US); Geoffrey A. Shapiro, Cedar Rapids, IA (US); Timothy R. Fannin, Urbana, IA (US); Keith A. Stover, Lisbon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 255 days.

(21) Appl. No.: 16/289,786

(22) Filed: Mar. 1, 2019

(51) Int. Cl.
*G01C 23/00* (2006.01)
*G08G 5/02* (2006.01)
*G01S 5/02* (2010.01)

(52) U.S. Cl.
CPC ............ *G08G 5/02* (2013.01); *G01S 5/0263* (2013.01); *G01S 5/0284* (2013.01)

(58) Field of Classification Search
CPC ........ G08G 5/02; G01S 5/0263; G01S 5/0284
See application file for complete search history.

(56) References Cited

U.S. PATENT DOCUMENTS

| 7,619,556 | B1 | 11/2009 | McCusker |
| 2013/0325215 | A1 | 12/2013 | Vos et al. |
| 2016/0335901 | A1 | 11/2016 | Singh et al. |
| 2018/0061243 | A1* | 3/2018 | Shloosh ............... G08G 5/0091 |

FOREIGN PATENT DOCUMENTS

EP 1065519 A1 1/2001

OTHER PUBLICATIONS

Extended Search Report dated Aug. 17, 2020 for EP Application No. 20160222.

* cited by examiner

*Primary Examiner* — Adam M Alharbi
(74) *Attorney, Agent, or Firm* — Suiter Swantz pc llo

(57) ABSTRACT

A system and method operate to leverage high assurance positioning systems to determine a hybrid deviation from an expected position, altitude, and path to generate a lateral and vertical signal indicating deviation from a desired position. As a filtered or alternative to conventional precision landing systems, the hybrid positioning system receives sensor data from a plurality of sensors and compares the received sensor data to known values to determine a deviation of position and trajectory. Extending the capability of existing auto-land systems, relative-to-runway sensors and/or filtered high assurance hybrid solutions are employed as an alternative to conventional precision landing systems. The sensors provide position data that is compared to an expected position and path to provide deviations in lateral, vertical, and speed augmenting traditional RF-based systems. The result includes a system capability for all weather landing leveraging traditional flight control systems to extend capabilities at all airports.

20 Claims, 14 Drawing Sheets

GUIDANCE DEVIATION DERIVATION FROM HIGH ASSURANCE HYBRID POSITION SOLUTION SYSTEM AND METHOD

CROSS-REFERENCE TO RELATED APPLICATIONS

The present application is related to the following co pending U.S. Patent Applications:

U.S. patent application Ser. No. 16/288,407 filed Feb. 28, 2019 entitled "Multispectrally Enhanced Synthetic Vision Database System and Method", U.S. patent application Ser. No. 16/288,531 filed Feb. 28, 2019 entitled "Design and Processing of Multispectral Sensors for Autonomous Flight", and U.S. patent application Ser. No. 16/288,770 filed Feb. 28, 2019 entitled "Autonomous Aircraft Sensor-Based Positioning and Navigation System Using Markers", the contents of which above-named U. S. Patent Applications are herein incorporated by reference in their entirety.

BACKGROUND

Most large commercial airfields maintain a precision landing system able to transmit precise positioning data to an aircrew and a Flight Management System (FMS) to enable an aircraft to accurately navigate to safe landing in all-weather conditions. Also, most commercial aircraft maintain hardware and avionics to enable the aircraft to receive and process signals from such precision landing systems. For example, an Instrument Landing System (ILS) may provide very precise glide slope and localizer information receivable by an aircraft. The aircraft may be capable of displaying this information (raw data) to a pilot as well as supplying the data to the FMS. Some advanced aircraft may maintain a capability to couple an autopilot to the FMS commanding the autopilot to correct for deviations in each received parameter (e.g., glideslope and azimuth) to safely navigate the aircraft to the runway.

Coupled with traditional autopilot capabilities, the advanced aircraft may accurately fly in a coupled mode through the descent, approach, landing, and rollout all based on received RF signals from the ground-based ILS transmitter and measured internal aircraft parameters (speed, pitch, and power).

Maintenance of an ILS system at an airfield may be expensive and cumbersome. In addition, some desirable airports do not possess the hardware required for transmission of precision ILS signals usable by arriving and departing aircraft. Low ceiling and visibility conditions may prohibit any aircraft from landing in these situations. No matter how advanced the aircraft, if the weather conditions (ceiling and visibility) are below a specific minimum value, no aircraft may legally land in certain conditions or locations.

Therefore, a need remains for a system and related method for offering hybrid precise positioning data and guidance deviation derivation and correction based on data received from a combined suite of sensors enabling the advanced aircraft to operate at any airport despite the weather conditions.

SUMMARY

In one aspect, embodiments of the inventive concepts disclosed herein are directed to a hybrid positioning and guidance system. The system may comprise a sensor suite onboard an aircraft, the sensor suite including a vision system (VS), a radio frequency (RF) radio detection and ranging (RADAR) system, a laser imaging detection and ranging (LIDAR) system, a map database, and an avionics suite. In addition to the sensor suite, the system may comprise an object identification and positioning system associated with the sensor suite including a processor and a storage and an autopilot associated with each of the aircraft and the object identification and positioning system.

In operation, the object identification and positioning system may function to receive sensor data from a sensor of the sensor suite, the sensor data including attributes of a sensed object and store the received sensor data in an onboard database within the storage, the onboard database including historical object data. The object identification and positioning system may also compare the received sensor data to the historical object data and therefore, identify the sensed object based on the comparison.

To update the database, the object identification and positioning system may determine if the attribute of the sensed object is in the onboard database and operate to update the onboard database with the attribute of the sensed object if the attribute is not within the historical object data.

In positioning, the object identification and positioning system may determine a relative aircraft hybrid position (AHP), the relative AHP relative to a target object and also determine an absolute AHP, the absolute AHP relative to a datum. Also, the object identification and positioning system may determine an aircraft trajectory based on the absolute AHP over time.

To determine a deviation from an assigned position and trajectory, the object identification and positioning system may compare the relative AHP and the absolute AHP to a desired position and determine a deviation between 1) the absolute AHP and the desired position, 2) the aircraft trajectory and a desired trajectory, and 3) the relative AHP and the target object. To correct the deviation, the object identification and positioning system may determine a correction to reduce the deviation and command the autopilot to perform the correction.

In a further aspect, a method for guidance deviation derivation from high assurance hybrid positioning may comprise receiving sensor data from a sensor of a sensor suite, the sensor data including an attribute of a sensed object and storing the received sensor data in an onboard database, the onboard database including historical object data. The method may continue with comparing the received sensor data to the historical object data and identifying the sensed object based on the comparison.

The method may continue with determining if the attribute of the sensed object is in the onboard database and updating the onboard database with the attribute of the sensed object if the attribute of the sensed object is not within the historical object data.

In positioning, the method may continue with determining a relative aircraft hybrid position (AHP) and an absolute AHP, the relative AHP relative to a target object, the absolute AHP relative to a datum, the absolute AHP including a three-dimensional coordinate plus time and then comparing the relative AHP and the absolute AHP to a desired position. In one embodiment, the method may also operate in determining an aircraft trajectory based on the absolute AHP over time.

For deviation derivation, the method may determine a deviation between one of 1) the absolute AHP and the desired position, 2) the aircraft trajectory and a desired trajectory, and 3) the relative AHP and the target object. To correct, the method may include determining a correction to reduce the deviation and commanding an autopilot to perform the correction.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which.

DETAILED DESCRIPTION OF EXEMPLARY EMBODIMENTS

Figure 1:
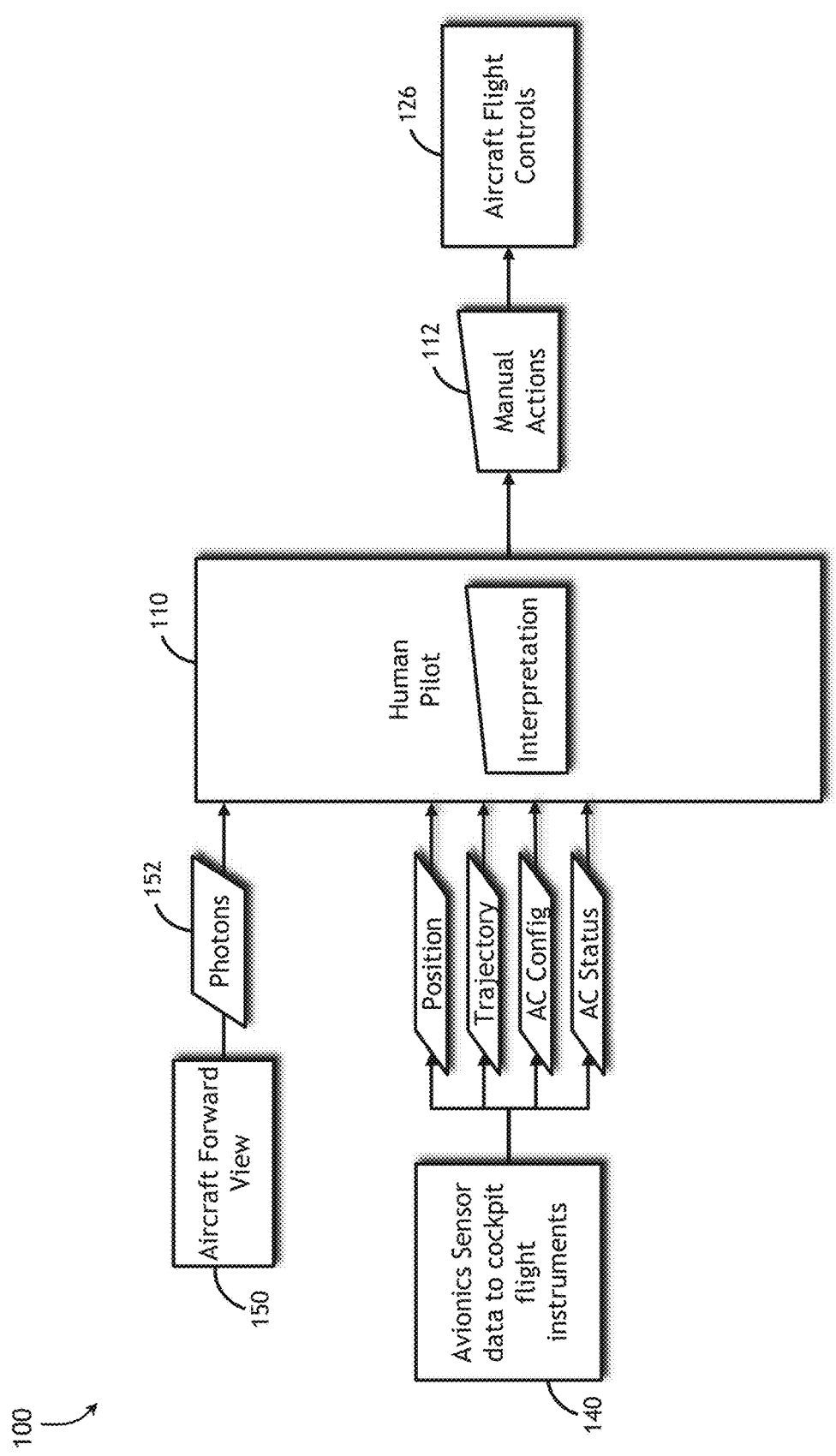
FIG. 1 is a flowchart for a basic human pilot action in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Overview

Broadly, embodiments of the inventive concepts disclosed herein are directed to a system and related method operate to leverage high assurance positioning systems to determine a deviation from an expected position, altitude, and path in a hybrid fashion to generate a lateral and vertical signal indicating deviation from a desired position (e.g., ILS). As a filtered or alternative to conventional precision landing systems, the hybrid positioning system receives sensor data from a plurality of sensors and compares the received sensor data to known or expected values to determine a deviation of position and trajectory. To extend the capability of existing auto-land systems (including full-autonomous operations), relative-to-runway sensors and/or filtered hybrid solutions of sufficient assurance are employed as an alternative to conventional precision landing systems. The sensors provide position data that is compared to an expected position and path (e.g., glideslope, flare, rollout, etc.) to provide deviations in lateral, vertical, and speed to augment traditional RF-based systems. The result includes a system capability for all weather landing leveraging traditional flight control systems to extend capabilities at all airports.

| Reference Chart | | | |
|---|---|---|---|
| 100 | Basic Human Pilot Action | 526 | Query if AHP within AHP deviation threshold of Assigned Position |
| 110 | Human Pilot | | |
| 112 | Manual Action | | |
| 120 | Autonomous Aircraft | 528 | Determine Deviation |
| 122 | Sensor Suite | 530 | Determine Correction |
| 124 | Autopilot | 532 | Command Correction |
| 126 | Flight Controls/Surfaces | 540 | Determine Monitor AHP |
| 140 | Avionics Sensor Data | 542 | Query if absolute AHP/ relative AHP within monitor deviation threshold of Monitor AHP |
| 150 | Aircraft Forward View | | |
| 152 | Photons | | |
| 200 | Coupled Aircraft System | | |
| 210 | Flight Management System | 544 | Alert |
| 300 | High Assurance Hybrid Positioning System | 550 | Receive Assigned Position |
| | | 600 | Method for Guidance |
| 310 | Object ID and Positioning System | 700 | Horizontal and Vertical Path |
| | | 710 | Horizontal Path |
| 320 | Avionics Suite | 712 | LUXOR |
| 330 | Vision System (VS) | 714 | SUVIE |
| 340 | RF Radar | 716 | HAMIG |
| 350 | LIDAR | 718 | RANVE |
| 360 | Maps | 720 | 19R TDZ |
| 400 | High Assurance Hybrid Positioning System with FMS | 722 | LAPIN |
| | | 730 | Vertical Path |
| 500 | Flow of Autonomous System with Machine Learning | 800 | Arrival |
| | | 830 | LIDAR Field of View (FOV) |
| 502 | Receive Sensor Data | 840 | Radar Energy |
| 504 | Phase of Flight Analysis | 842 | Radar LIDAR Significant Runway |
| 506 | Determine Sensor Hierarchy | | |
| 508 | Store Data Onboard | 844 | Radar LIDAR Significant Track |
| 510 | Compare | 846 | Golf Course |
| 512 | Database Query | 848 | Solar Array |
| 514 | Update Onboard Database | 850 | Buildings Vertical |
| 516 | Share Data Offboard | 852 | Buildings Downtown |
| 518 | ID Object | 854 | Buildings Grouping |
| 520 | Determine Relative AHP | 856 | Ball Park |
| 522 | Determine Absolute AHP | 858 | Road Curve |
| 524 | Determine Relative or Absolute AHP is AHP | 860 | North Downtown Building |
| | | 862 | Building Pair |
| | | 864 | Hangar |
| | | 866 | Circular Formation |
| 868 | Warehouse | 886 | Runway Number |
| 870 | Perimeter Road | 888 | Runway Centerline Markings |
| 872 | Jet Blast Fence | 890 | TDZ Markings |
| 874 | Runway 19L | 892 | Airfield Building |
| 876 | Hotel Taxiway | 900 | Transition |
| 878 | Visually Significant Building | 1000 | Initial Approach |
| 880 | Threshold Markings | 1100 | Approach |
| 882 | Echo Taxiway | 1200 | Final Approach |
| 884 | Runway ID | 1300 | Landing Transition |

FIG. 1 VFR Human Pilot

Referring now to FIG. 1, a flowchart for a basic human pilot action in accordance with an embodiment of the inventive concepts disclosed herein is shown. Basic human pilot action 100 may generally include a human pilot 110 reaction to visual cues and manipulating aircraft flight controls 126 as the pilot desires. The visual cues may refer to an aircraft forward view 150 providing photons 152 to the eyes of the human pilot 110. The human pilot 110 may then interpret the visual cues and provide manual actions 112 to a stick and rudder to manipulate the aircraft flight controls 126. Here, flight controls 126 may include ailerons or other rolling devices, elevators or additional pitch devices, rudders or other yaw controls, and power settings to control engine and aircraft speed.

Under visual flight rules (VFR), the human pilot 110 must be able to visually acquire an object (such as a runway) to maneuver the aircraft relative to the object (e.g., landing). In addition to visual cues, the human pilot 110 may rely on avionics sensors to cockpit flight instruments 140 to aid in safe aircraft operation. Such sensors may offer the human pilot 110 a plurality of data such as airspeed, altitude and heading to aid the human pilot 110 in aircraft operation. Avionics sensors 140 may provide position information, trajectory information, aircraft configuration, and aircraft status, bolstered by a plurality of additional data offered to the human pilot 110 to aid in aircraft operation. The VFR human pilot 110 may, however, be limited to fair weather operation and be unable to legally and safely operate in all weather conditions.

Figure 2:
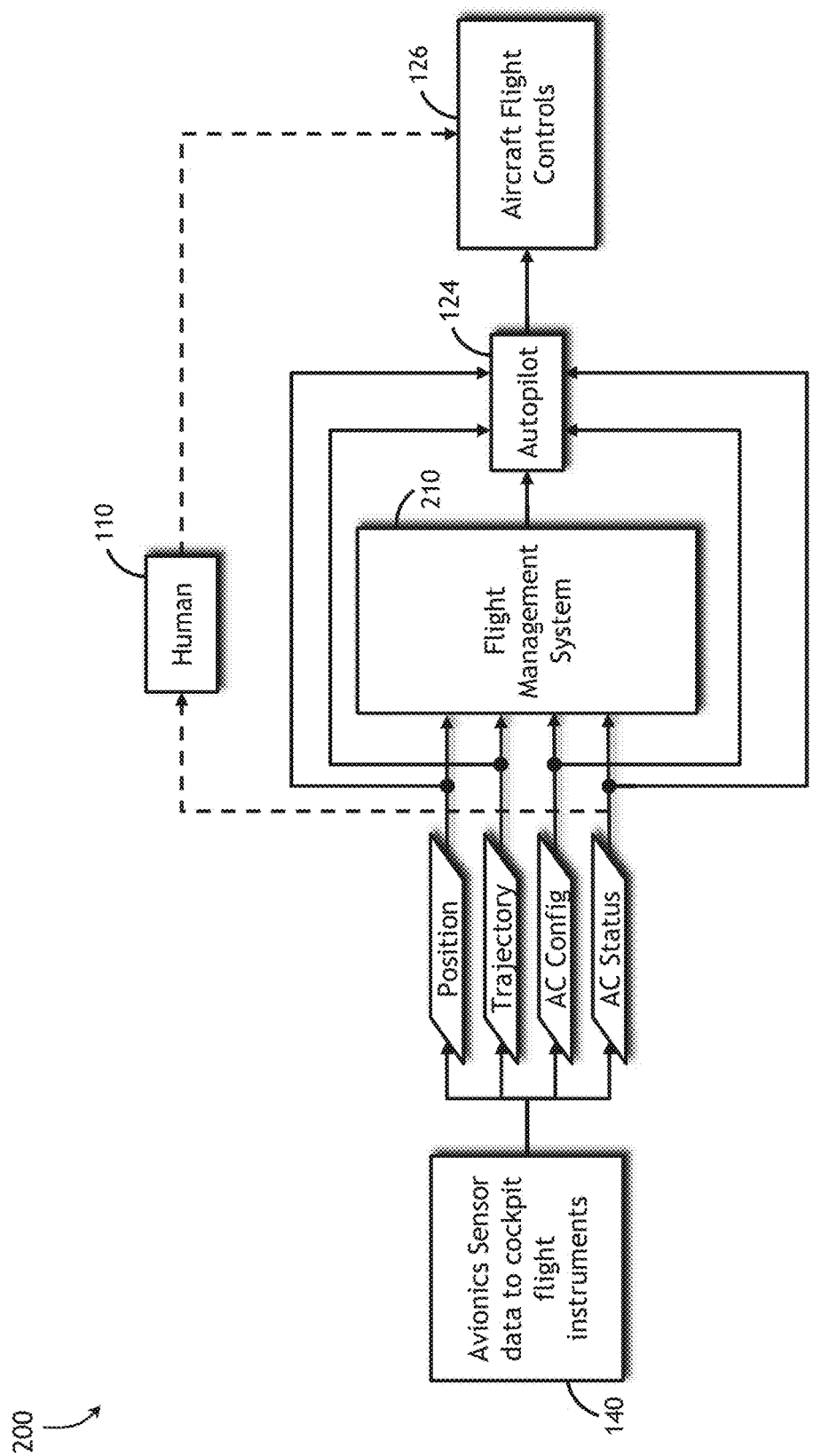
FIG. 2 is a flowchart for a coupled aircraft architecture in accordance with an embodiment of the inventive concepts disclosed herein.

FIG. 2 Coupled Architecture

Referring now to FIG. 2, a flowchart for a coupled aircraft architecture in accordance with an embodiment of the inventive concepts disclosed herein is shown. A coupled aircraft system 200 may offer all weather capabilities to an aircraft. As before in the VFR scenario, the coupled aircraft system 200 may receive similar avionics sensor data 140 including the listed items of position, trajectory, configuration and status. Here, an FMS 210 may receive these inputs and determine deviations from commanded parameters to current parameters and determine a correction to reduce the deviation. The FMS 210 may then command the autopilot 124 to apply those corrections to the aircraft flight controls 126 to enable accurate aircraft trajectory.

In all situations within this architecture, the human pilot 110 may intervene and remove the FMS 210 from the command flow. The human pilot 110 may take over manually and manipulate the aircraft flight controls 126 to control the aircraft trajectory.

Figure 3:
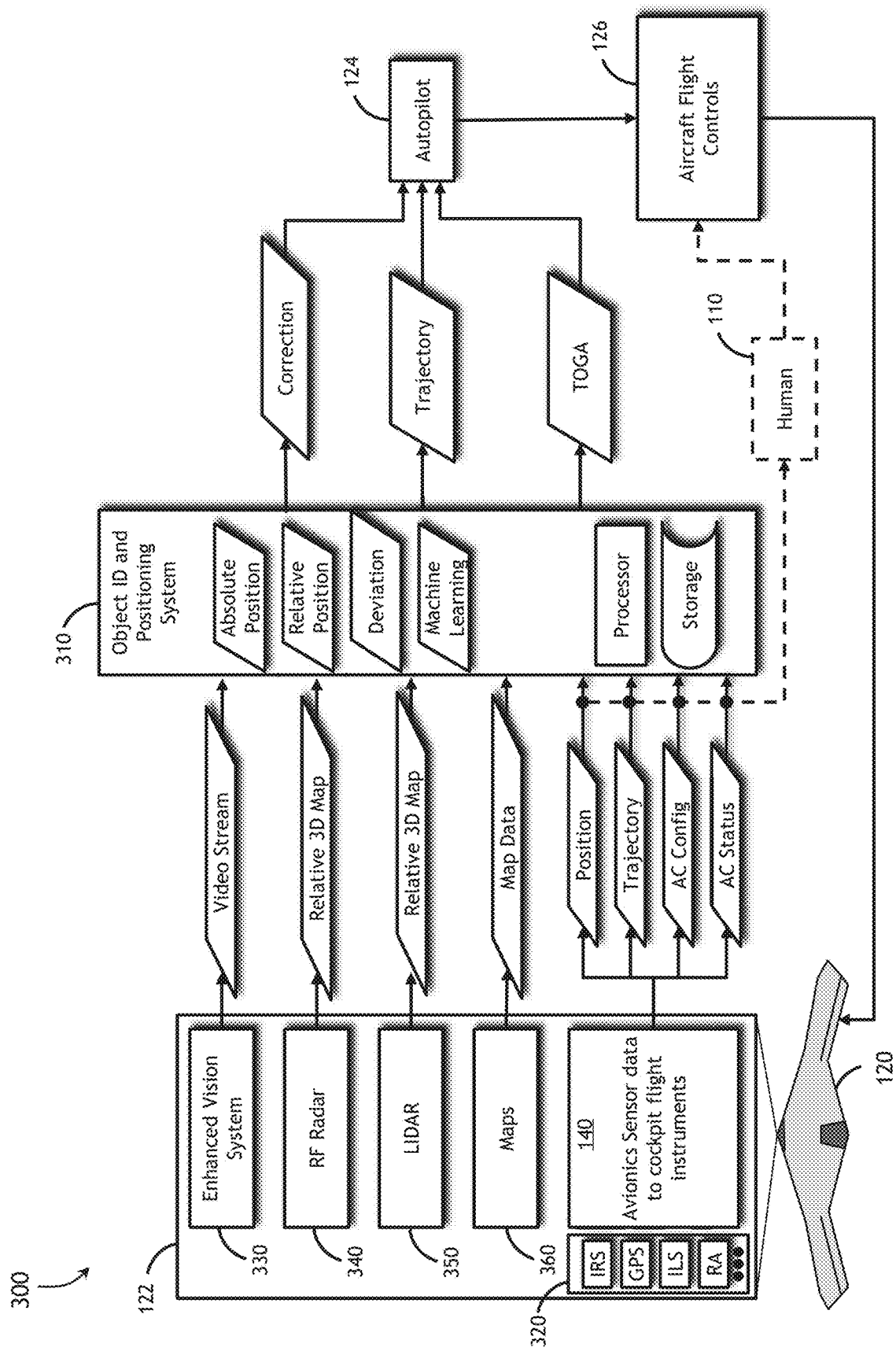
FIG. 3 is a flowchart for a high assurance hybrid positioning system onboard an aircraft exemplary of an embodiment of the inventive concepts disclosed herein.

FIG. 3 Object ID System

Referring now to FIG. 3, a flowchart for a high assurance hybrid positioning system onboard an aircraft exemplary of an embodiment of the inventive concepts disclosed herein is shown. A high assurance hybrid positioning system 300 for determining an aircraft hybrid position (AHP) may offer an operator a plurality of options for positioning and navigation. Here, an object identification and positioning system 310 is introduced which may function to at least 1) receive inputs from a plurality of sensors, 2) determine a high assurance hybrid positioning solution from which it may also 3) derive a guidance deviation and 4) command the autopilot 124 to reduce the guidance deviation. The object identification and positioning system 310 may employ an exemplary Kalman Fusion and Rejection filter to fuse each set of sensor data and provide a hierarchy of sensor data sets from which to derive the AHP.

The plurality of sensors may include a sensor suite 122 onboard the aircraft 120 providing avionics sensor data 140 from an avionics suite 320, a video stream from a vision system 330, relative 3D map data from a radio frequency (RF) radio detection and ranging (RADAR) system 340 and a laser imaging detection and ranging (LIDAR) system 350, map data from a map system 360.

In one embodiment of the inventive concepts disclosed herein, the sensor suite 122 may include a plurality of sensors configured for providing information to the object ID and positioning system 150. An operator may select one or more sensors to accomplish a specific mission yet minimize size, weight, power and cost. Each sensor suite may span a large swath of the electromagnetic spectrum allowing atmospheric penetration in the relevant ranges of approximately 1 to 10 km. Sensors which may operate in the Visual Spectrum, from approximately 450 to 700 nm, in the Near-Infrared (NIR) spectrum of approximately 750 to 950 nm, in the Short-Wave Infrared (SWIR) spectrum operating approximately in the 1-2 µm spectral band and thermal infrared sensors operating in the 3 to 5 µm and 7 to 15 µm bands may fall within the scope of the inventive concepts disclosed herein.

These sensors may support frame rates of a minimum required of about 10 Hz and up to 400 Hz, or more. Other sensors may operate in the Radio-Frequency bands, from X to W band, from 10 GHz to 220 GHz and operate in pulsed or Frequency Modulated Continuous Wave (FMCW) RADAR mode, with frame update rates of a minimum of 10 Hz and up to 30 Hz or higher, potentially scanning a "region of interest" within the total field of view. Each of these sensors may provide "Enhanced Vision System" capabilities to a modern cockpit. Another type of "synthetic" image may be computer generated from an onboard a-priori database and is typically referred to as a "Synthetic Vision System (SVS)". Each of these sources of positioning information may be combined into a "Combined Vision System (CVS)" which may present to a human pilot flying (onboard and remote), and to an autonomous aircraft pilotage system, an overall reliable and assured view of the operating environment in all visibility conditions.

In embodiments, sensor data may include an object attribute such as an object identification, a position of the object, an altitude of the object, and a relative bearing range altitude (BRA) of the object relative to the aircraft.

The AHP may be defined as one or more hybrid positions the object identification and positioning system 310 may determine. One AHP may be a relative AHP relative to a target object or an airborne position or target object in space to which the aircraft 120 is commanded. For example, one relative AHP may include an AHP relative to a runway or landing surface including an approach from a specific direction to avoid terrain or an obstacle. Another relative AHP may include a position relative to an airborne target object to which the aircraft may be assigned. For example, the aircraft 120 may be assigned an elevated 1000 ft in trail or level at 135 degrees aspect and 500 ft distant. One difference between a ground-based target object and an airborne target object may include altitude and velocity. Here, the object identification and positioning system 310 may receive the sensor data and correlate received data with an assigned target object to command the autopilot 124 to maneuver the aircraft 120 appropriately.

A target object may include any object to which or from which the operator of the aircraft 120 may desire navigation or positioning. Here, a target object may include a landing surface, a flight deck, an aircraft, and a target of interest.

Additionally, target objects may include a flight deck, an aircraft, a surface objective (stationary or in motion), and wherein the trajectory further includes a taxi segment, a takeoff segment, a departure procedure, a cruise course, a localizer course, a glide path, a weapons/package delivery profile, an arrival procedure, an initial approach segment, a final approach segment, and a landing segment.

For example, on a descent and approach to landing at a specific airfield, an arriving aircraft may receive clearance to fly a specific descent profile including position, time, altitude and speeds at specific points over the ground enroute to the airfield. An assigned arrival may be a published arrival and approach to the airfield or a received profile to perform a mission.

The trajectory may include a taxi segment, a takeoff segment, a departure procedure, a cruise course, a localizer course, a glide path, an arrival procedure, an initial approach segment, a final approach segment, a landing segment, an air traffic control (ATC) assigned procedure, and an internally generated or received flight path.

In one embodiment of the inventive concepts disclosed herein, the operator of the aircraft 120 may include not only the human pilot 110, but also a remote operator and a commander of the autonomous aircraft issuing orders via data link.

An additional position the object identification and positioning system 310 may determine is an absolute AHP. The absolute AHP may be relative to a datum. The absolute AHP may include, inter alis, a position (e.g., latitude longitude), a trajectory, a time, an altitude Above Ground Altitude (AGL) and Mean Seal Level (MSL), an airspeed, a groundspeed, a vertical path, a vertical speed, and a rate of climb or descent. The datum may include a vertical geodetic reference datum (e.g., MSL, AGL) as well as a horizontal geodetic reference datum (e.g., latitude/longitude, grid coordinates).

In one embodiment of the inventive concepts disclosed herein, the object identification and positioning system 310 may include a processor and a storage. The processor may include instruction in compliance with the Kalman Filter and synthesis of the received sensor data. The storage may be functional to store a plurality of attributes associated with each object.

The object identification and positioning system 310 may be configured to receive sensor data from one or more sensors of the sensor suite where the sensor data may include the plurality of attributes associated with a sensed object. Here, a sensed object may be defined as any object within a field of view (FOV) of one of the sensors and able to be imaged and therefore measured by the sensor. Also, a sensed object may include a terrain object, a geographical object, a natural object, a man-made object, an airport prepared surface, and a landing surface. An attribute of the sensed object may include characteristics of the sensed object which may highlight the object to the specific sensor.

For example, an attribute of a sensed object may include an object three-dimensional position relative to the datum (e.g., latitude, longitude, MSL altitude), a visibly distinct difference from surrounding terrain (e.g., color texture, size, terrain flow), and a RADAR cross section (RCS). Additional factors which may describe an attribute include a specific map feature, a shape, a size, a reflectivity level, a frequency, a wavelength, a temperature, an emissivity, a bandwidth a radar cross section, and a color a reflectivity level, a radar cross section, and a frequency of RF radiation. Each sensor within the sensor suite 122 may sense a specific one or more attributes of an object and operate solely (positioning) or in concert (hybrid positioning) to assist the object identification and positioning system 310 in determining a precise position of the aircraft 120.

For example, the vison system (VS) 330 may include a plurality of components and capabilities. One component of the VS 330 may include a Synthetic Vision System (SVS) configured to receive data from a database and provide attributes to the object ID and positioning system 310 for use in positioning. Another component of the VS 330 may include an Enhanced Vision System (EVS) including a camera sensor of a plurality of wavelengths and providing those camera sensed attributes to the object ID and positioning system 310. Additionally contemplated herein, a Combined Vision System (CVS) may incorporate within the VS 330 to provide a synthesis of both database attributes with camera sensed attributes offered to the object ID and positioning system 310 for analysis and position determination.

The VS 330 may be capable of imaging a specific pattern of terrain such as a mountain range, a runway pattern, a river, or a river valley. One attribute of the terrain or runway object may be its distinct difference from surrounding terrain. Coupled with a terrain database within the object identification and positioning system 310, the enhanced vison system 330 by itself may offer precise positioning ability to the aircraft 120 based on a single bearing and range from the known position of the known (historical attributes) object or a triangulation of bearings from two or more visibly sensed objects.

The RF RADAR 340 may operate solely as a positioning system as well, capable of BRA determination from a single known object or a BRA triangulation from two or more sensed objects. Also, the RF RADAR 340 may function to complement each of the other sensors within the sensor suite 122. A RADAR significant object having a RADAR cross section (RCS) measurable by the RF RADAR 340 sensor may be one example of an object sensed by the RF RADAR 340. Depending on RF RADAR 340 sensitivity, an object with a high RCS or low RCS may be desirable object to use as a hybrid positioning object.

For example, an electrical grid hub of converging towers and wires may be exceptionally visible to the RF RADAR 340. Compared with historical positioning data within the object identification and positioning system 310 database, the object identification and positioning system 310 may determine the AHP based on BRA information as well as an aircraft trajectory and speed from position data over time. Sensed RADAR data compared with RCS attributes of historical objects within the terrain database in the object identification and positioning system 310 may offer precise triangulation positioning capabilities based solely on returns from the RF RADAR 340 or offering the object identification and positioning system 310 an AHP based on sensed data from one or more of the additional sensors within the sensor suite 122.

The sensor suite may also employ the LIDAR system 350 to sense objects nearby the aircraft 120. Transmitted laser energy from the aircraft 120 may produce a detailed snapshot of sensed objects within the FOV of the LIDAR 360. As with the additional sensors, the LIDAR system 350 may supply relative #D map data to the object identification and positioning system 310 allowing the object identification and positioning system 310 to determine positioning information based on the sensed object BRA from the aircraft 120. Combined with data from additional sensors, the object identification and positioning system 310 may determine the AHP base on the data received from the combined sensors.

Map system 360 may function to provide the object identification and positioning system 310 with detailed ground map data from an area near the aircraft 120. Combined with inputs from onboard positioning systems, the object identification and positioning system 310 may receive the map data and correlate the map data with positioning data to determine the AHP.

For example, the map data may include an airport diagram including runways, taxiways, and buildings (hangars). The object identification and positioning system 310 may correlate the AHP with the map data to navigate the aircraft 120 to a position for possible landing on one of the runways. Further, during a taxi phase, the object identification and positioning system 310 may accurately navigate the aircraft 120 based on the AHP correlated with the airport diagram of the taxiways.

The avionics suite 320 may operate to provide the object identification and positioning system 310 with traditional avionics sensor data 140 allowing the object identification and positioning system 310 to correlate the avionics sensor data with the determined AHP. An inertial reference system (IRS) may function as traditional inertial systems to offer an accurate positioning information to the object identification and positioning system 310.

A global positioning system (GPS) may offer similar likely more accurate positioning information to the object identification and positioning system 310. Here, the term GPS may refer to all satellite-based positioning and timing systems. The generic term GPS is used here for descriptive purposes only and may not limit the use of additional satellite-based systems for the object identification and positioning system 310 to determine the AHP.

An ILS system may provide the object identification and positioning system 310 with accurate localizer and glideslope information relative to a desired runway. By itself, the ILS system has traditionally and accurately guided aircraft to runways. In association with the object identification and positioning system 310, the ILS may offer accurate positioning information relative to the landing runway and increase the accuracy of the AHP.

In one embodiment of the inventive concepts disclosed herein, a Radio Altimeter (RA) system may operate similar to traditional manner offering precise altimetry within a threshold altitude AGL. For example, if the aircraft 120 is operating at or below an exemplary 2,000 ft AGL, the RA may offer range data from the aircraft 120 to the surface below. Especially during landing operations, the RA system may become a valuable source of AGL altitude information available to the object identification and positioning system 310 and the FMS 210.

In some embodiments, a Very high frequency Omnidirectional Range (VOR) system may operate to complement the object identification and positioning system 310 since these are 1) ubiquitous throughout the world, of known position, and 3) RCS and LIDAR significant. With or without receiving an RF transmission from the VOR station, one of the additional sensors within the sensor suite 122 may sense the physical antenna of the VOR and offer a precise positioning BRA information to the object identification and positioning system 310 for determination of the AHP.

However, each of the avionics suite 320 systems may possess inherent limitations. A GPS signal may be jammed or unavailable. A glideslope portion or the entirety of an ILS system may be inoperative requiring alternate procedures. The VOR may lose power and be offline. Each of these limitations may require reliance on other positioning systems for the object identification and positioning system 310 to determine the AHP. Nevertheless, when operable, each of the avionics sensors 320 may offer valuable information to the object identification and positioning system 310 to complement the AHP.

In one embodiment of the inventive concepts disclosed herein, the object identification and positioning system 310 may store the received sensor data in an onboard database within the storage, the onboard database including historical object data. The historical object data may include specific attributes defining the object. For example, position, altitude, and size may be specific attributes defining an object. The object identification and positioning system 310 may compare the received sensor data to the historical object data and identify the sensed object based on the comparison. Should the object identification and positioning system 310 make a match between the sensed data and the historical data, the object identification and positioning system 310 may positively identify the object.

Of note, each individual sensor within the sensor suite 122 may offer more accurate sensor data at differing ranges and altitudes. For example, at an altitude of 45,000 ft MSL (FL450), the GPS may be the most accurate of the sensors while at 110 ft AGL, the VS may offer the most accurate set of data to the object ID and positioning system 310. Acting in concert, the suite of sensors 122 may offer the hybrid positioning solution at all altitudes.

In one embodiment of the inventive concepts disclosed herein, the object identification and positioning system 310 may employ a hierarchy of data sets from which to fuse to determine the most accurate AHP for the specific phase of flight. The example above may illustrate the GPS being an accurate sensor from which to derive the AHP at higher altitudes. At lower altitudes, the object identification and positioning system 310 may alter the hierarchy of sensor data sets. For example, at 5,000 ft AGL, the RF RADAR 340 may offer accurate positioning data fused with GPS data to the object identification and positioning system 310. At 1,000 ft AGL, the VS 330 fused with the RA may offer a most accurate set of data to the object identification and positioning system 310.

The below table may illustrate one exemplary altitude-based and phase-based hierarchy of sensor ranked by the object identification and positioning system 310:

| Altitude AGL | Phase of Flight | Sensor Hierarchy |
| --- | --- | --- |
| >10,000 | Cruise | GPS |
| | | IRS |
| | | Maps |
| 5,000 | Cruise/Descent | GPS |
| | | RF RADAR |
| 2,000 | Approach | LIDAR |
| | | RF RADAR |
| | | GPS |
| 500 | Short Final | VS |
| | | RA |
| | | GPS |
| 50 | Landing | VS |
| | | RA |

Here, one sensor hierarchy may be altitude based while another may be mission, speed, and/or sensor fidelity based. Regardless of the basis for hierarchy, the object identification and positioning system 310 may identify which sensor may be the most accurate as well as which sensors are worthy of analysis. For example, at FL450, the RA may be nearly useless as range to the surface may be too distant for the RA to receive useable data.

Machine Learning

Should the object identification and positioning system 310 identify the sensed object and receive an additional attribute associated with the sensed object, the object identification and positioning system 310 may determine if the at least one attribute of the sensed object is in the onboard database. If not, the object identification and positioning system 310 may update the onboard database with the newly found attribute of the sensed object. In this manner, the object identification and positioning system 310 may update the onboard database to include the new attribute of the sensed object.

Further, should the object identification and positioning system 310 receive sensed information concerning an object not found within the onboard database, it may operate to store each attribute of the newly found object and increase the quality of the onboard database for future use. For example, should an old building add an additional floor increasing the height attribute of the building or add additional structure to an existing roof feature, the object identification and positioning system 310 may store these new attributes within the onboard database.

Moreover, the object identification and positioning system 310 may operate to share its updated database offboard the aircraft 120 (e.g., wirelessly) so additional systems on other aircraft may take advantage of the updated and increasingly accurate data.

The object identification and positioning system 310 may function to identify the sensed object based on the identification of the attributes of the object. In a comparison of historical attributes to sensed attributes, the object identification and positioning system 310 may operate to identify the sensed object. In addition, the object identification and positioning system 310 may compare the sensed attribute with the historical object data, the comparison including a percentage-based threshold match of a totality of object attributes. Here, a higher percentage of matching attributed may rise to an accurate identification of the sensed object while the object identification and positioning system 310 may set a threshold percentage below which the sensed object may be discarded in favor of a higher percentage match of object attributes.

In addition to AHP, the object identification and positioning system 310 may determine an aircraft trajectory based on the absolute or relative AHP over time. Based on a groundspeed (absolute) or closure velocity (relative), the object identification and positioning system 310 may determine a trajectory (e.g., velocity and direction) of the aircraft 120 relative to the datum (absolute) or relative to the target object (relative).

Further, object identification and positioning system 310 may compare the absolute AHP to a desired position and determine a deviation: 1) between the absolute AHP and the desired position, 2) between the aircraft trajectory and a desired trajectory, and 3) between the relative AHP and the target object. Here, the desired position may be an exemplary assigned position by ATC, an assigned published approach procedure, an assigned target object, an assigned checkpoint along a route, and the like. Also, the desired trajectory may include an exemplary run-in heading for weapons delivery, a localizer and glideslope, an assigned track to be maintained, a rate of climb, descent, or level, and the like. These differences may include a difference in three-dimensional space (e.g., latitude longitude altitude) and time (e.g. early or late) to enable the object identification and positioning system 310 to determine a correction to reduce the deviation and command the autopilot 124 to perform the correction.

For example, the correction may be to increase a rate of descent to return to an assigned glideslope or to turn to a different heading to resume the assigned track as winds may change. In embodiments, the magnitude of the correction commanded by the object identification and positioning system 310 may be directly proportional with the magnitude of the deviation. Once within a threshold distance from the target object, the object identification and positioning system 310 may command the autopilot 124 into an Autoland mode for very precise flare and rollout maneuvers.

In certain situations, an aircraft closing with a target object (e.g., within the touchdown zone of a runway), may be required to execute a go-around or missed approach maneuver. The maneuver may include a takeoff and go around (TOGA) mode of an FMS 210. In this situation, the aircraft 120 may be commanded by the object identification and positioning system 310 to a trajectory which will increase the separation between the aircraft 120 and the target object.

For example, during an approach to a runway, the aircraft 120 is on short final and a truck enters the runway obstructing the landing area. ATC may command the aircraft 120 to execute a go around maneuver and the aircraft may internally select the TOGA mode of the flight. Here, the object identification and positioning system 310 may command the TOGA mode and command the autopilot 124 to fly a prescribed path, speed and altitude to separate from the obstructed runway.

In one embodiment of the inventive concepts disclosed herein, the object identification and positioning system 310 may also determine a groundspeed of the aircraft based on the sensor data as well as determine a deviation between the groundspeed and an assigned speed. Should the object identification and positioning system 310 determine a deviation exists, it may determine a correction to reduce the deviation and command the autopilot 124 to apply the correction.

As above, in a manned aircraft 120, the human pilot 110 may intervene to manually fly the aircraft 120 as desired. Conversely, in an autonomous aircraft 120, the object identification and positioning system 310 may command the flight path.

Figure 4:
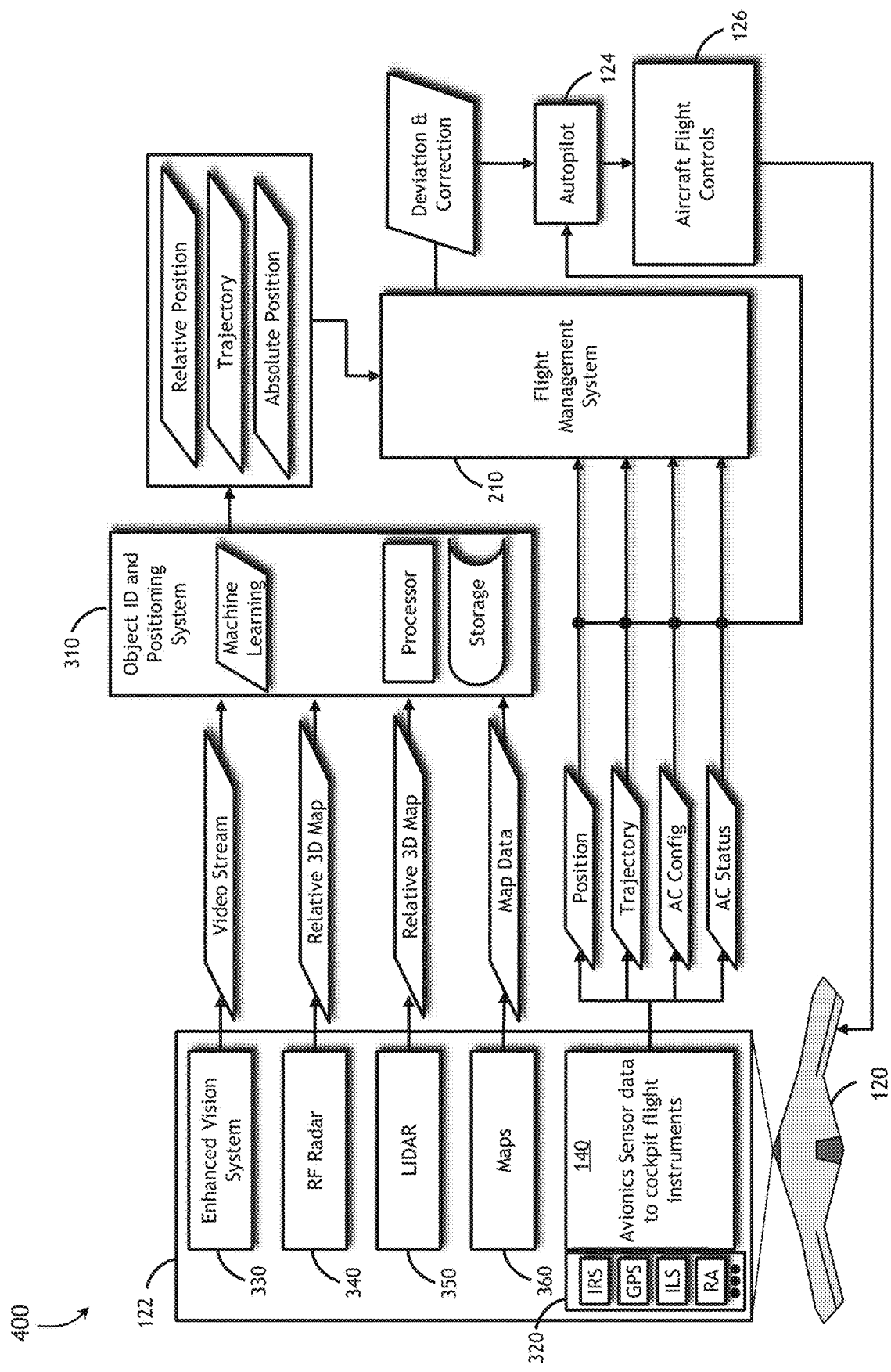
FIG. 4 is a flowchart for a high assurance hybrid positioning system with FMS exemplary of one embodiment of the inventive concepts disclosed herein.

FIG. 4 Object ID with FMS

Referring now to FIG. 4, a flowchart for a high assurance hybrid positioning system with FMS exemplary of one embodiment of the inventive concepts disclosed herein is shown. A high assurance hybrid positioning system with FMS 400 may operate similarly to the system 300 however, some distinct differences may be present. An FMS 210 may be employed to receive position and trajectory information from the object identification and positioning system 310.

Here, the object identification and positioning system 310 may generate the relative AHP along with trajectory data and provide offer the high assurance position solutions to the FMS 210. The FMS may then correlate this information to its world-wide database and generate improved position accuracy to use while providing guidance information for the autopilot 124 and flight controls 126. One advantage of the FMS system 400 is that the FMS 210 may already have all the data necessary to turn the relative AHP data from the sensor suite 122 into an absolute AHP and guidance outputs to support more complex (e.g., curved) approach and landing procedures.

Figure 5A:
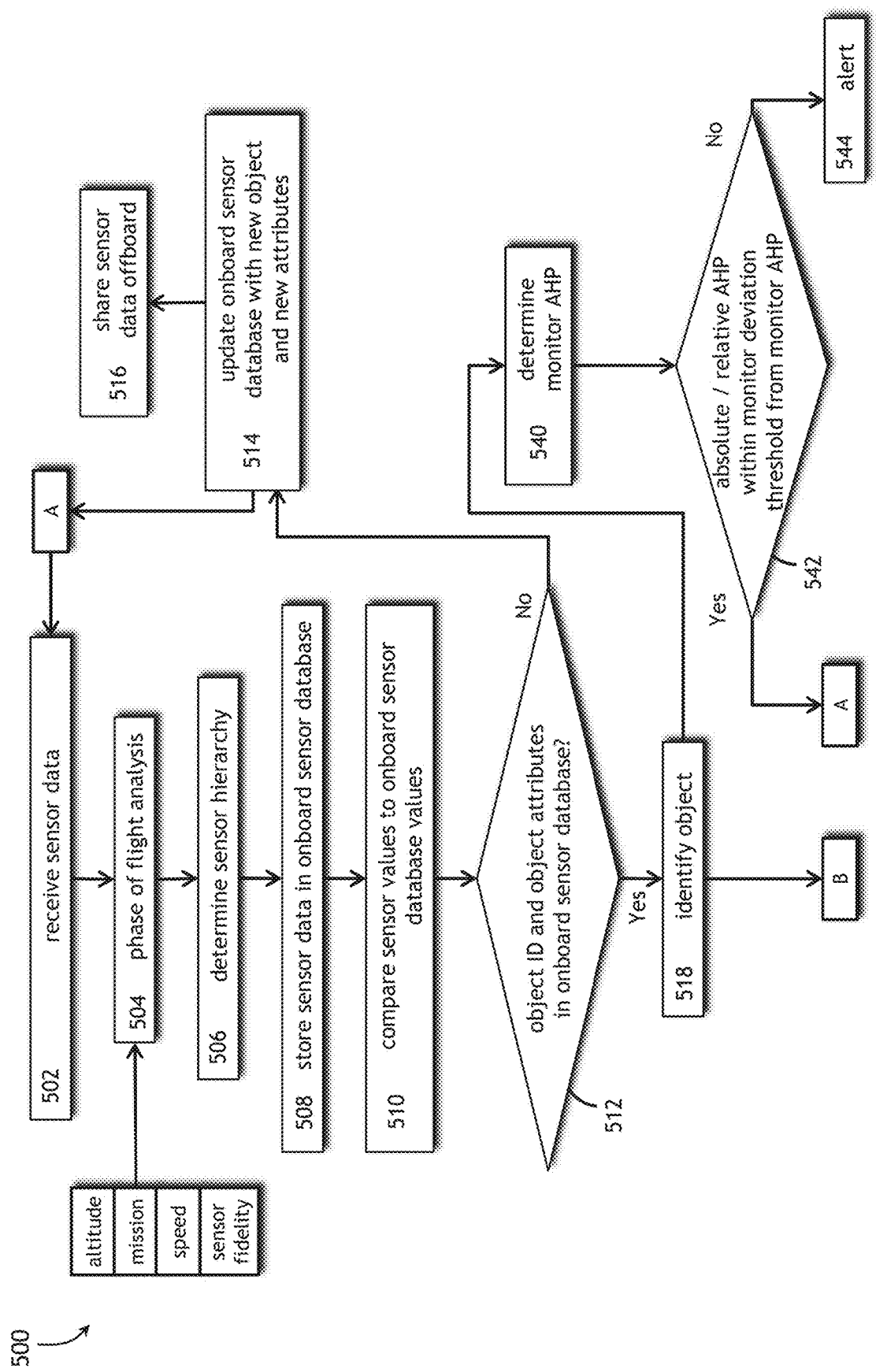
FIGS. 5A and 5B are a flowchart for a high assurance hybrid positioning system with guidance deviation correction in accordance with one embodiment of the inventive concepts disclosed herein.
Figure 5B:
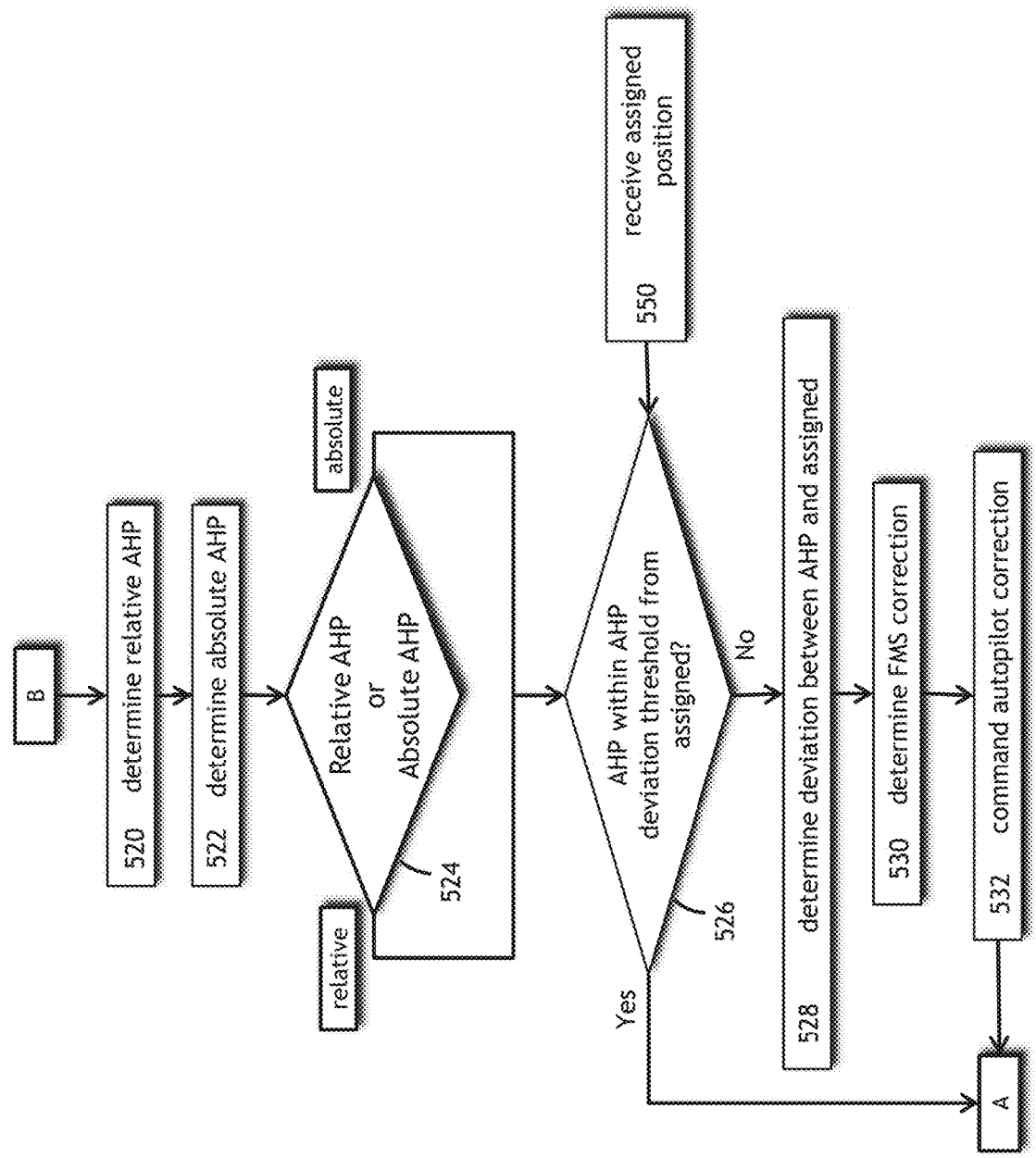

FIG. 5A 5B Logic Flow

Referring now to FIGS. 5A and 5B, a flowchart for a high assurance hybrid positioning system with guidance deviation correction in accordance with one embodiment of the inventive concepts disclosed herein is shown. Logic flow for high assurance hybrid positioning system with machine learning 500 may include simplified steps to accomplish one goal of the systems of FIGS. 3 and 4. Here, a step 502 may include receive sensor data as a nearly continuous process. The object identification and positioning system 310 may, at a step 504, employ a phase of flight analysis to determine one or more follow on steps.

For example, the phase of flight analysis at step 504 may function to determine which sensors may be of greater value to the object identification and positioning system 310 in determining the AHP. Included as exemplary inputs in the phase of flight analysis 504, may be altitude, mission, speed, and sensor fidelity. The altitude input may indicate where the aircraft is within a profile. For example, at 50 ft AGL and 100 knots groundspeed the aircraft may be assumed to be landing while at FL390 the aircraft may be in cruise and the object identification and positioning system 310 may determine an appropriate sensor data to use. A mission analysis may include what the aircraft is tasked to do. For example, a point to point profile may include a takeoff, cruise, and landing while a combat profile may include a takeoff, aerial refueling, ordinance delivery, and landing. A speed analysis may include relative closure with the target object as well as ground speed relative to the datum. Sensor fidelity analysis may include a determination of sensor effectiveness during weather or night operations. For example, the VS 330 may be less effective at night operations than during the daytime.

At a step 506, the object identification and positioning system 310 may determine the sensor hierarchy base in part on the phase of flight analysis. Similar with the phase of flight analysis, the sensor hierarchy may determine a hierarchy of sensors from which the object identification and positioning system 310 may use sensor data to determine the most accurate AHP.

A step 508 may operate to store the sensor data within the onboard sensor database. As above, the sensor data may include data received from one or more sensors within the sensor suite 122. A step 510 may compare the received sensor values with values found in the onboard database. In a step 512, the object identification and positioning system 310 may query whether the sensed object ID and sensed object attributes match those attributes stored in the onboard database. This query 512 may include whether the object has been sensed before and whether each attribute of the historical object is the same as before or one or more attributes has changed.

Should the sensed attribute or object ID not be found in the onboard database, the object identification and positioning system 310 may, at a step 514, update the onboard database with the new object as well as update the onboard database with the new sensed attribute of an existing object. Once updated, the object identification and positioning system 310 may share, at a step 516, the updated onboard database offboard the aircraft to, for example, a central system capable of sharing the received data with other aircraft. Should the object identification and positioning system 310 determine the object attribute may be within the onboard database, a step 518 may identify the object and continue with box B to FIG. 5B.

In one embodiment of the inventive concepts disclosed herein, the object identification and positioning system 310 may include, at a step 540, determination of a monitor AHP. The monitor AHP may include a data stream separate from the data used to determine both the relative AHP and the absolute AHP. For example, should the object identification and positioning system 310 determine the relative AHP using the data sensed by the VS 330, the object identification and positioning system 310 may use data from the GPS system to determine the monitor AHP. In this manner, the object identification and positioning system 310 may continuously monitor, via a separate sensor, a quality of the determined absolute or relative AHP.

Further, at a step 542, the object identification and positioning system 310 may query if the absolute and or relative AHP is within a monitor deviation threshold from the monitor AHP. In one example, the monitor deviation threshold may include a maximum number of meters laterally and a maximum number of feet vertically.

Should the absolute AHP or relative AHP be within the monitor deviation threshold, the object identification and positioning system 310 may continue the logic flow to box A for a return to step 502. However, should the absolute AHP or relative AHP be outside the monitor deviation threshold, the object identification and positioning system 310 may, at a step 544, announce an alert to, for example, the operator. In one example, this alert may trigger a go around maneuver, a TOGA mode, and an FMS directed flight to safe altitude.

Referring now to FIG. 5B, the object identification and positioning system 310 may, at a step 520, determine the relative AHP and, at a step 522, determine the absolute AHP. Based on the phase analysis and sensor hierarchy, the object identification and positioning system 310 may, at a step 524 determine which of the relative or absolute AHP may be better suited for use as the AHP. The logic may continue in the same manner regardless of which AHP is in use.

At a step 526, the object identification and positioning system 310 may query if the AHP is within an AHP deviation threshold of a received, at a step 550, assigned position. If within the AHP deviation threshold, the logic moves back to step 502 via box A. If outside of the AHP deviation threshold, the object identification and positioning system 310 may, at a step 528, determine the deviation between the AHP and the assigned position. At a step 530, the object identification and positioning system 310 may determine an FMS correction to reduce the deviation and, at a step 532 the object identification and positioning system 310 may command the autopilot to apply the determined correction.

In determining each of the monitor deviation threshold and the AHP deviation threshold, the object identification and positioning system 310 may set each deviation threshold (AHP and monitor) based on the phase of flight analysis. In this manner, the object identification and positioning system 310 may set the deviation threshold at a lesser value during precise operations and a higher value during non-precision operations. For example, during a landing phase, the allowable deviation threshold may be quite small while in cruise, the allowable deviation threshold may be greater.

FIG. 6 Method Flow

Figure 6:
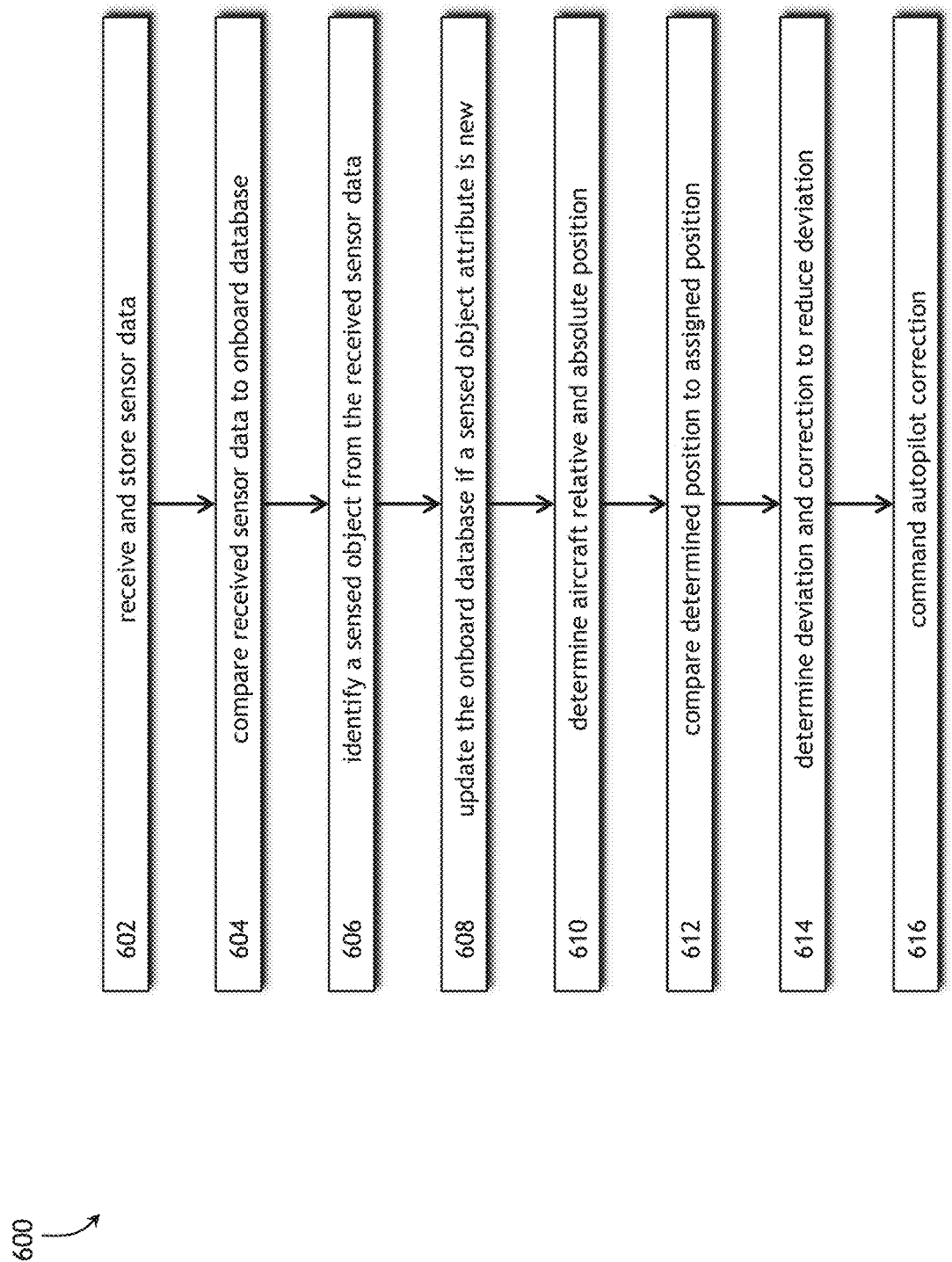
FIG. 6 is a diagram of an exemplary method for guidance deviation derivation from high assurance hybrid position solution in accordance with one embodiment of the inventive concepts disclosed herein.

Referring now to FIG. 6, a diagram of an exemplary method for guidance deviation derivation from high assurance hybrid position solution in accordance with one embodiment of the inventive concepts disclosed herein is shown. Simplified method flow 600 of the object identification and positioning system 310 may include, at a step 602, with receive and store sensor data, and at a step 604, compare received sensor data to onboard database. At a step 606 the method may identify a sensed object from the received sensor data and, at a step 608, update the onboard database if a sensed object attribute is new. At a step 610, the method may determine aircraft relative and absolute position, and, at a step 612 compare determined position to assigned position. At a step 614, the method may determine deviation and correction to reduce deviation and at a step 616, command autopilot correction.

In one embodiment of the inventive concepts disclosed herein, the method may further include an analysis of the attribute associated with the sensed object. In addition, updating the onboard database with the attribute of the sensed object may include updating the onboard database with a sensed object not currently within the onboard database and sharing the updated onboard database offboard the aircraft 120. In another embodiment, determining the relative AHP may include determining a bearing, range, altitude and closure velocity relative to the target object.

In one embodiment of the inventive concepts disclosed herein, the sensor suite 122 may operate in a passive mode. Here, an emissions control or EMCON mode may offer similar accuracy in positioning without transmission of RF energy.

In determining a deviation, the object ID and positioning system 310 may determine a groundspeed of the aircraft based on the received sensor data, determine a deviation between the groundspeed and an assigned speed, determine a correction to reduce the deviation, and command the autopilot to apply the correction.

FIG. 7 Path

Figure 7:
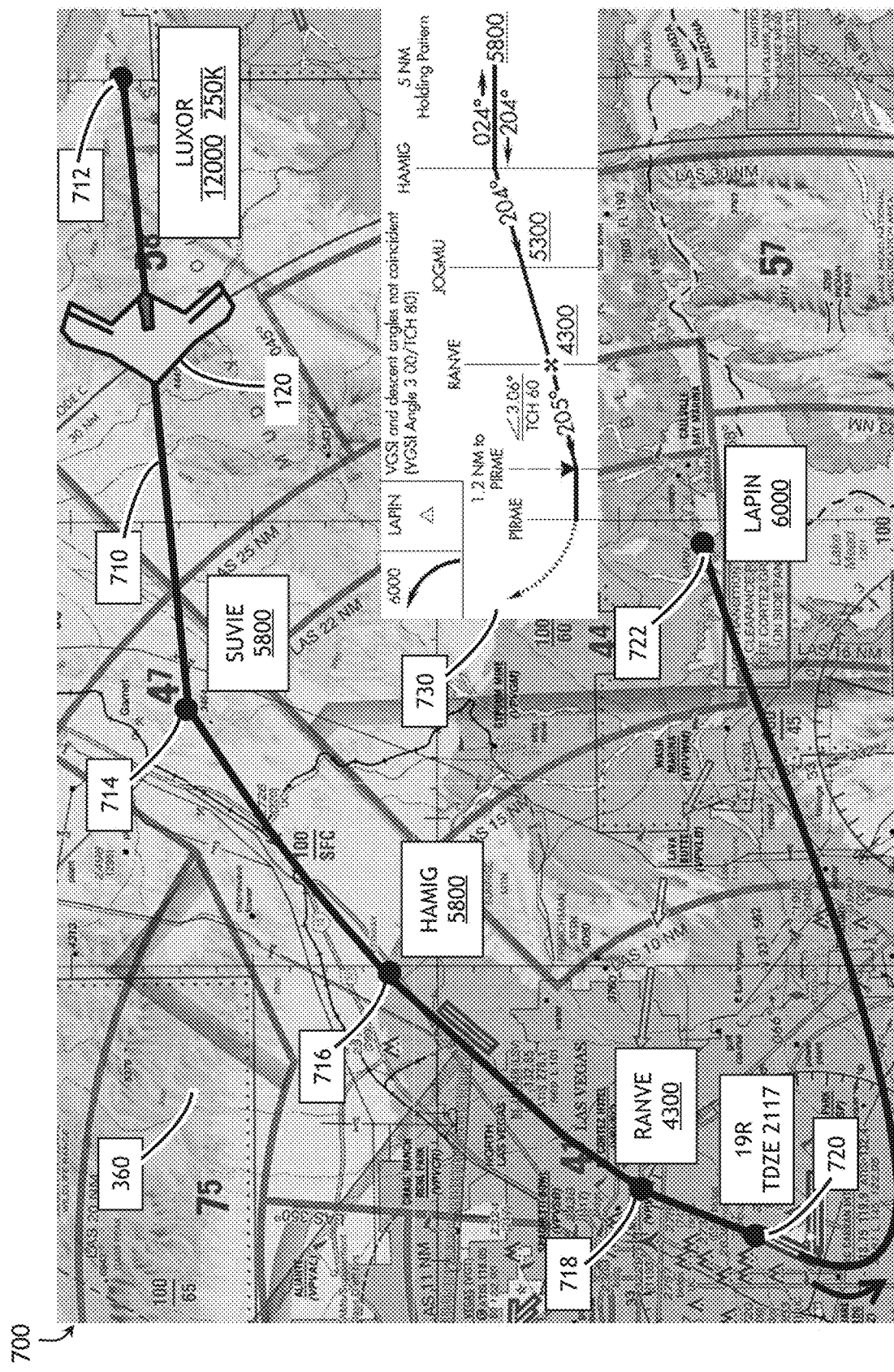
FIG. 7 a diagram of an exemplary horizontal and vertical map data path associated with one embodiment of the inventive concepts disclosed herein.

Referring now to FIG. 7, a diagram of an exemplary horizontal and vertical map data path associated with one embodiment of the inventive concepts disclosed herein is shown. Exemplary map data of a horizontal and vertical path 700 may indicate a path 710 to which the aircraft 120 may be assigned. Of note, maps 360 may include map data such as the terrain map in FIG. 7 indicating terrain heights, obstructions, and ground features which may be usable by the object ID and positioning system 310 as sensed objects within or new to the onboard database. Aircraft 120 may be assigned the path 710 to fly to a landing at one exemplary target object of the touchdown zone (TDZ) of runway 19R 720 at Las Vegas.

For example, the aircraft 120 equipped with the object ID and positioning system 310 may receive clearance from ATC to comply with the GRNPA TWO arrival followed by the RNAV (GPS) RWY 19R approach into Las Vegas (KLAS). Here, each of the arrival and approach may mandate compliance with required altitudes and airspeeds for various points along the route Of note, the touchdown zone elevation (TDZE) of runway 19R is 2117 feet MSL which may be one example of an attribute of the target object stored within the database of the object ID and positioning system 310. A vertical path 730 may indicate the assigned vertical profile to be flown by aircraft arriving at runway 19R.

The path 710 may include a plurality of points each having a possible restriction in altitude and airspeed. For example, at LUXOR 712, each arriving aircraft must arrive at 12,000 ft MSL and 250 knots indicated airspeed (KIAS). At SUVIE 714 and HAMIG 716, each arriving aircraft must be above 5,800 ft MSL with no published speed restriction more restrictive than the maximum airspeed below 10,000 ft MSL of 250 KIAS in the US. The restriction at RANVE 718 is a minimum altitude of 4,300 ft MSL which may be extracted from the vertical path 730 restriction at RANVE 718.

For any reason, should the aircraft 120 may unable to land on runway 19R, the object ID and positioning system 310 must execute a go around maneuver and command the TOGA mode of the FMS. The missed approach instructions may mandate a climb to ensure obstacle clearance and traffic flow. Here, the missed approach instructions included in the vertical path 730 mandate a climb to 6000 ft MSL and a left turn to LAPIN 722 for holding or further assignment.

Along the path 710, the sensor suite 122 may image a plurality of sensed objects and supply the sensed data to the object ID and positioning system 310 for hybrid positioning and ultimately, horizontal and vertical navigation along the path 710 to a safe touchdown at the 19R TDZ 720.

FIG. 8 Arrival

Figure 8:
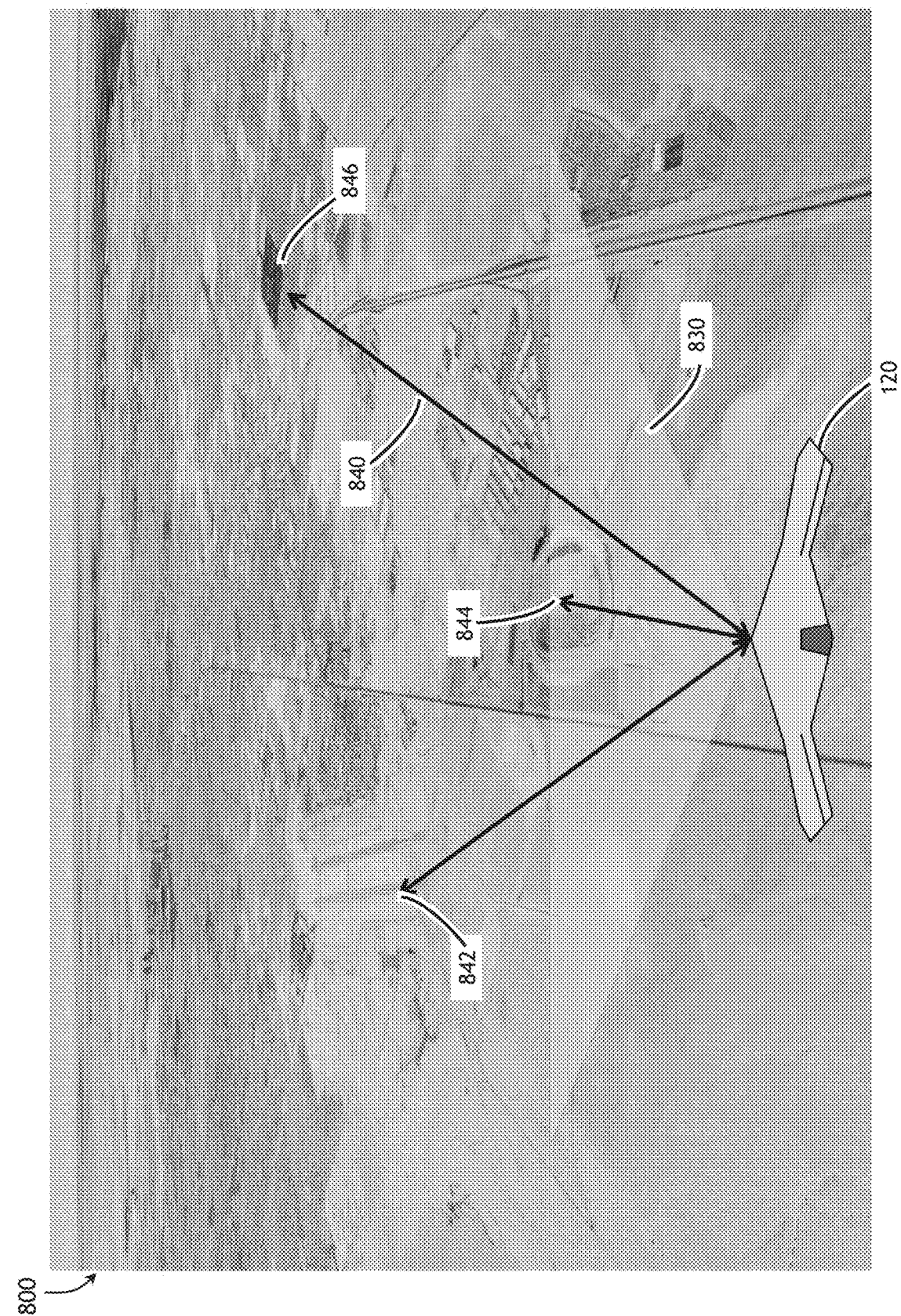
FIG. 8 is a diagram of an autonomous aircraft sensing ground objects on arrival exemplary of one embodiment of the inventive concepts disclosed herein.

Referring now to FIG. 8, a diagram of an autonomous aircraft sensing ground objects on arrival exemplary of one embodiment of the inventive concepts disclosed herein is shown. An arrival view 800 may portray objects available to the sensor suite 122 for use. Approaching HAMIG 716, the aircraft 120 may be at approximately 5,800 ft MSL with a wide view of the surface. Here, a plurality of objects within view of the sensors may include RADAR significant objects as well as LIDAR significant objects. A LIDAR FOV 830 may indicate a possible area of capability of the LIDAR 350.

RADAR energy 840 may enable the RF RADAR 340 to image RADAR significant ground objects such as a runway 842, a racetrack 844 and a golf course 846 while LIDAR FOV 830 may enable the LIDAR 350 to image the same and additional objects. Although shown as a forward view LIDAR FOV 830, each of the sensors may possess an ability to sense objects at any relative bearing from the aircraft 120. For example, one LIDAR system 350 may be able to view objects in a complete 360-degree relative azimuth above as well as below the aircraft 120. It is contemplated herein, sensors creating a "sphere" of FOV with the aircraft 120 at the center of the sphere may enable the sensor suite 122 to sense objects without bearing limitation.

Of note, many objects may not be mutually exclusive to a single sensor within the sensor suite 122. For example, a visually significant object may also be LIDAR significant while a RADAR significant object may also be an identifiable map object. Each of the sensors within the sensor suite 122 may operate individually to sense each of the significant objects within view to provide sensor data to the object ID and positioning system 310.

FIG. 9 Transition

Figure 9:
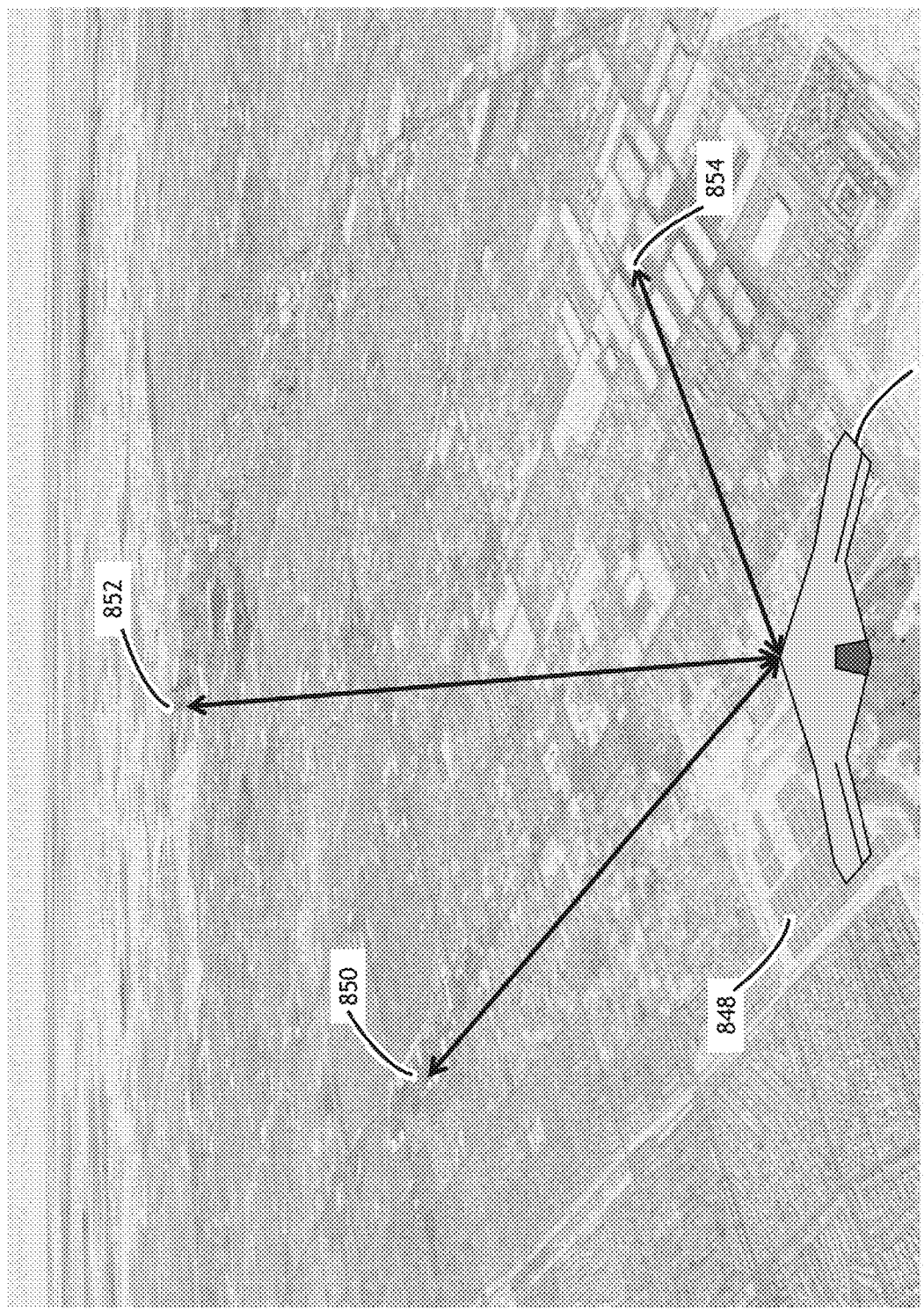
FIG. 9 is a diagram of an autonomous aircraft sensing ground objects transitioning to approach exemplary of one embodiment of the inventive concepts disclosed herein.

Referring now to FIG. 9, a diagram of an autonomous aircraft sensing ground objects transitioning to approach exemplary of one embodiment of the inventive concepts disclosed herein is shown. A transition view 900 may indicate a different set of possible objects. Between HAMIG 716 and RANVE 718, the FOV from the sensor suite 122 may be able to image an electrical solar array 848, a set of vertical buildings 850, a downtown building 852, and a grouping of buildings 854. Again, each of these sensed objects may maintain a plurality of attributes to enable the object ID and positioning system 310 to identify each as well as update the database with possible new attributes associated with the sensed object.

Figure 10:
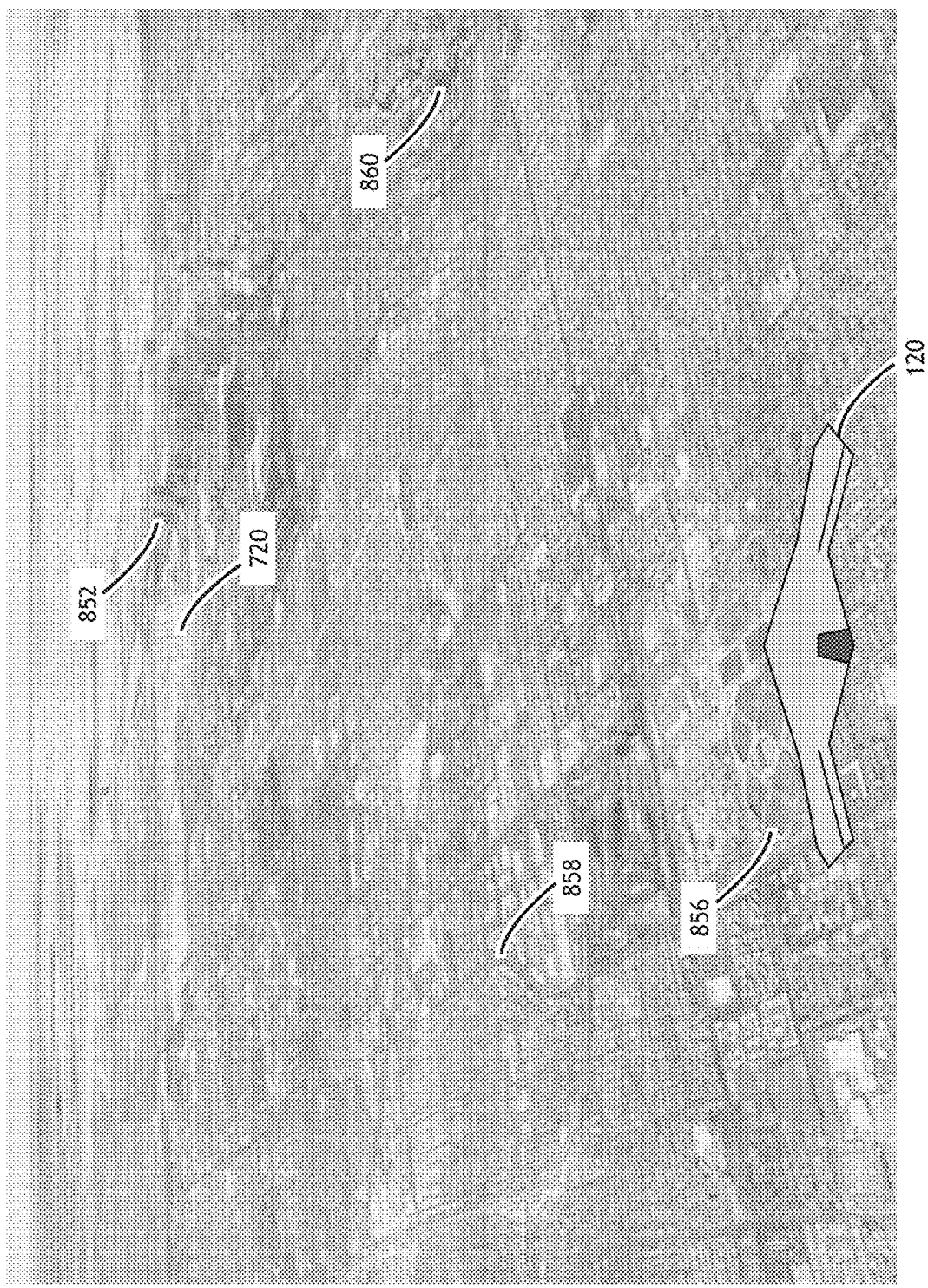
FIG. 10 is a diagram of an autonomous aircraft sensing ground objects on approach associated with one embodiment of the inventive concepts disclosed herein.

FIG. 10 Initial Approach

Referring now to FIG. 10, a diagram of an autonomous aircraft sensing ground objects on approach associated with one embodiment of the inventive concepts disclosed herein is shown. With an initial approach view 1000, the sensor suite 122 may be able to sense more objects as the aircraft 120 descends closer to the surface. Approaching RANVE 718 descending to 4,300 ft MSL, the aircraft 120 LIDAR FOV 850 may image a baseball park 856, a road curve 858, the TDZ of runway 19R 720, and a north downtown building 860. Here, one or more sensors may continue to sense the proximal downtown building 852 as the aircraft 120 nears the TDZ 19R 720.

FIG. 11 Approach

Figure 11:
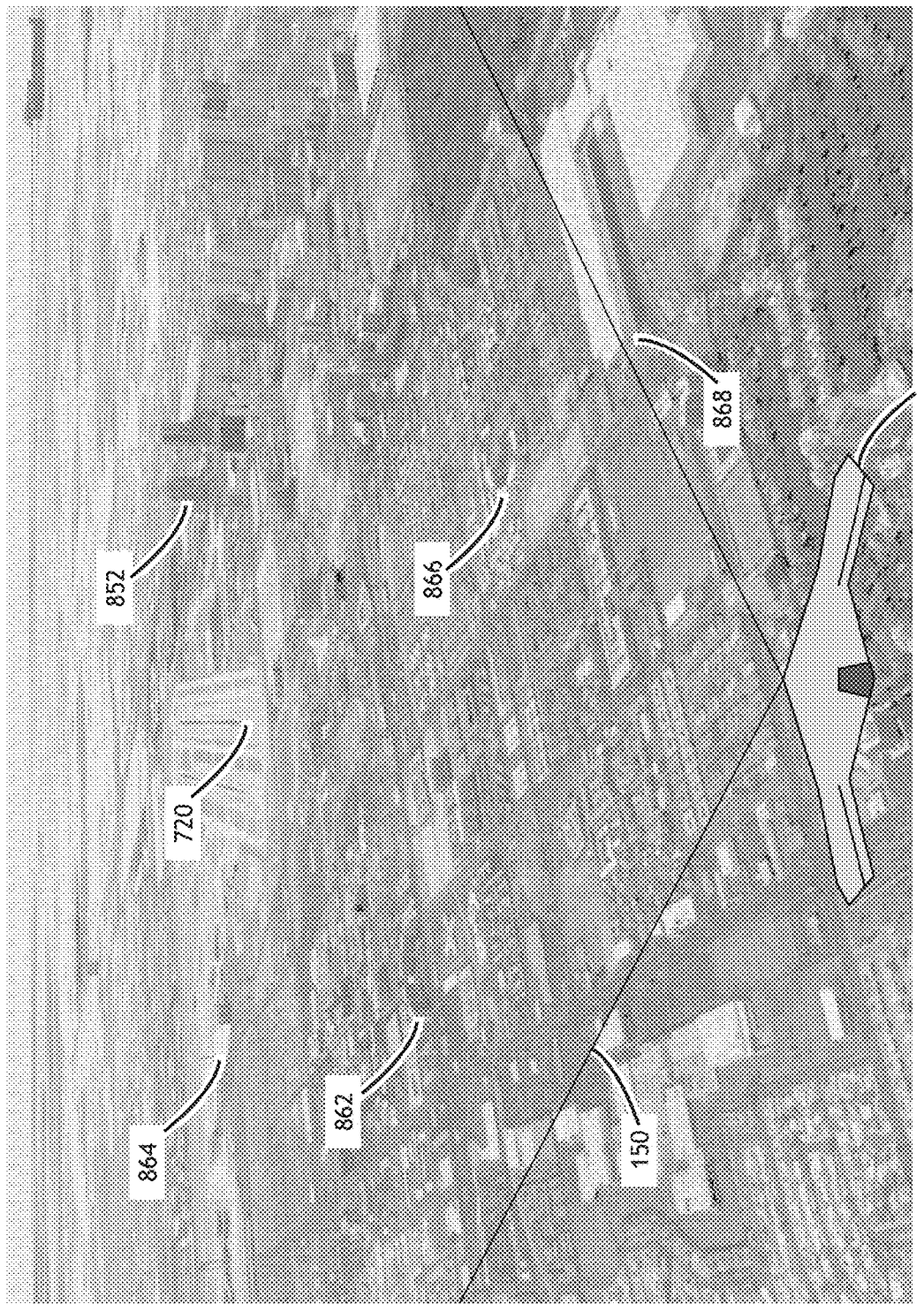
FIG. 11 is a diagram of an autonomous aircraft sensing ground objects on approach in accordance with one embodiment of the inventive concepts disclosed herein.

Referring now to FIG. 11, a diagram of an autonomous aircraft sensing ground objects on approach in accordance with one embodiment of the inventive concepts disclosed herein is shown. In an approach view 1100, the aircraft 120 may descend to RANVE 718 at 4,300 ft MSL (now 2,183 ft AGL), the sensor suite 122 may closer to the surface and able to image a plurality of objects with a variety of attributes suitable for ranging. Here, the TDZ 19R 720 becomes more visible to the VS 330 and the vertical attribute of the downtown building 852 may be apparent to each of the sensors.

In one embodiment of the inventive concepts disclosed herein, the aircraft forward view 150 may be one desirable FOV of the VS 330. Each sensor may sense a building pair 862, a hangar 864, a circular formation of buildings 866 and a northeastern corner of a warehouse 868.

Exemplary attributes of the warehouse 868 may include a latitude, longitude, elevation, orientation, shape, size, color, roof texture, including attributes within the warehouse such as each exterior corner and specific objects on the roof (cooling units, etc.). Each of these attributes may be stored within the onboard database allowing the object ID and positioning system 310 to correlate sensed data with stored data to determine not only the relative AHP but the absolute AHP.

Figure 12:
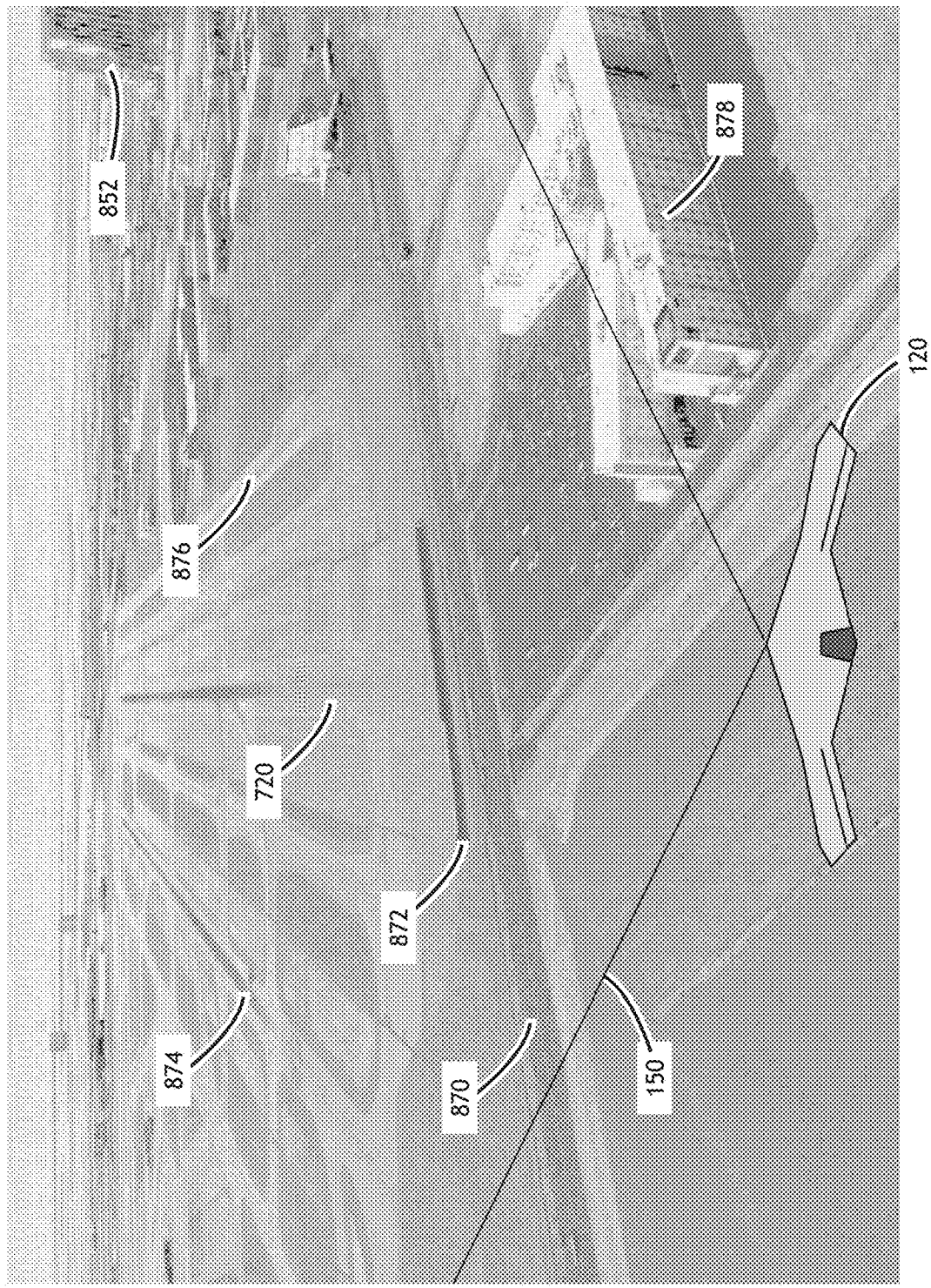
FIG. 12 is a diagram of an autonomous aircraft sensing ground objects on final approach associated with one embodiment of the inventive concepts disclosed herein.

FIG. 12 Final Approach

Referring now to FIG. 12, a diagram of an autonomous aircraft sensing ground objects on final approach associated with one embodiment of the inventive concepts disclosed herein is shown. A final approach view 1200 may indicate objects more visible to the VS 330 and thus offer a more accurate relative AHP than would data from other sensors. Approaching TDZ19R 720, the aircraft 120 sensor suite 122 may image a perimeter road 870, a jet blast fence 872, a runway 19L 874, a hotel taxiway 876, and a visually significant building 878. The vertical downtown building 852 may remain visible to one or more of the sensors offering continued BRA data to the object ID and positioning system 310.

FIG. 13 Landing

Figure 13:
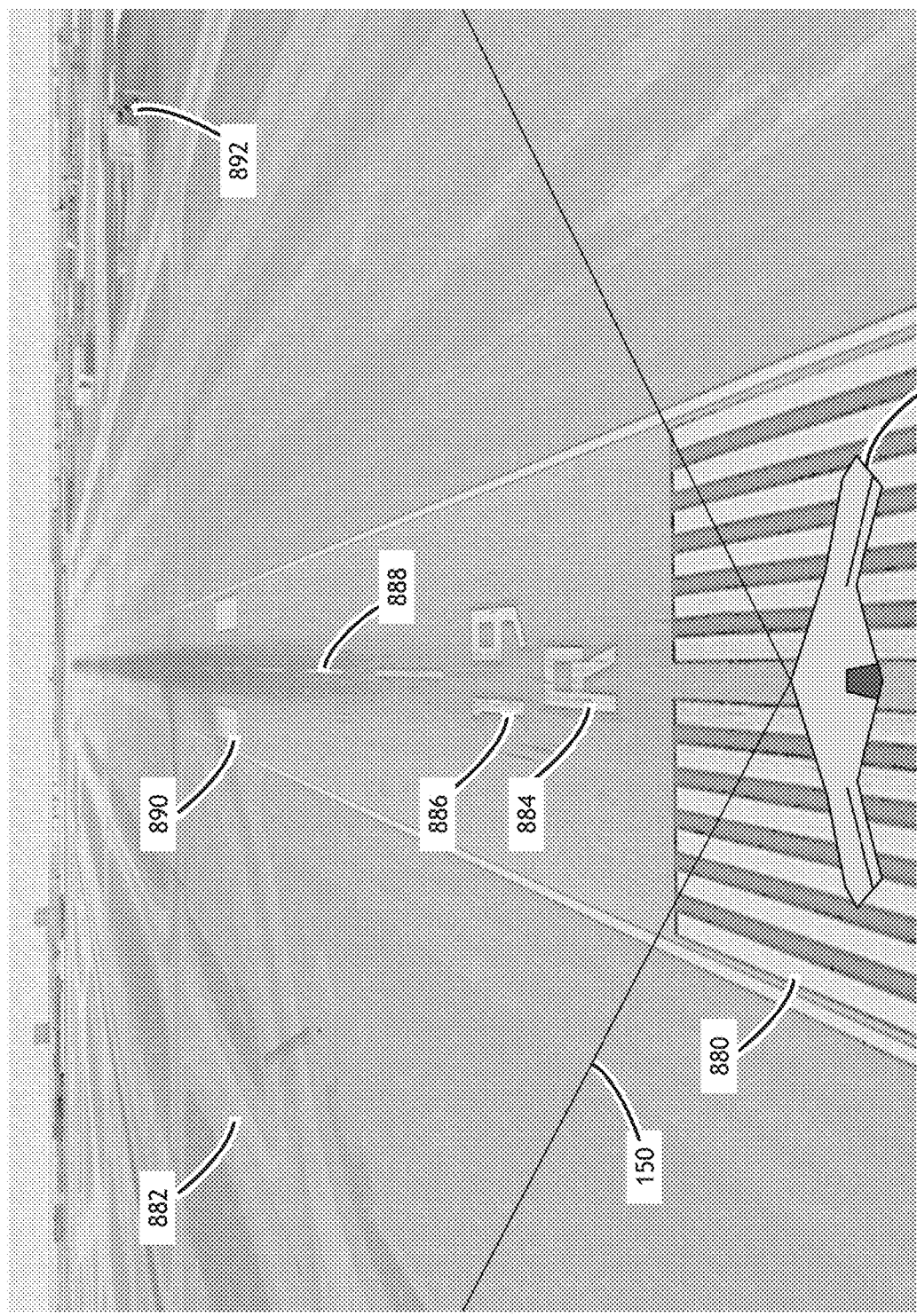
FIG. 13 is a diagram of an autonomous aircraft sensing ground objects over runway threshold associated with one embodiment of the inventive concepts disclosed herein.

Referring now to FIG. 13, a diagram of an autonomous aircraft sensing ground objects over runway threshold associated with one embodiment of the inventive concepts disclosed herein is shown. A landing transition view 1300 may offer a diagram of objects visible to one or more of the sensors as the aircraft 120 crossed over the landing threshold of 19R 720. Here, the VS 330 may visualize threshold markings 880, the echo taxiway 882, a runway identifier 884, a runway number 886, a runway centerline 888 and TDZ markings 890. With other previously sensed buildings possibly out of the aircraft forward view 150, airfield building 892 may offer accurate positioning data to the object ID and positioning system 310.

CONCLUSION

As will be appreciated from the above description, embodiments of the inventive concepts disclosed herein may provide a system and related method for offering hybrid precise positioning data and guidance deviation derivation and correction based on data received from a combined suite of sensors enabling the advanced aircraft to operate at any airport despite the weather conditions.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A hybrid positioning and guidance system, comprising:
    a sensor suite onboard an aircraft, the sensor suite including at least one of: a vision system (VS), a radio frequency (RF) radio detection and ranging (RADAR) system, a laser imaging detection and ranging (LIDAR) system, a map database, and an avionics suite;
    an object identification and positioning system associated with the sensor suite including at least one processor and a storage; and
    an autopilot associated with each of the aircraft and the object identification and positioning system;
    a tangible, non-transitory memory within the storage configured to communicate with the at least one processor, the tangible, non-transitory memory having instructions stored therein that, in response to execution by the at least one processor, cause the at least one processor to:
        receive sensor data from at least one sensor of the sensor suite, the sensor data including at least one attribute of a sensed object;
        store the received sensor data in an onboard database within the storage, the onboard database including historical object data;
        compare the received sensor data to the historical object data;
        identify the sensed object based on the comparison;
        determine if the at least one attribute of the sensed object is in the onboard database;
        update the onboard database with the at least one attribute of the sensed object if the at least one attribute of the sensed object is not within the historical object data;
        determine a relative aircraft hybrid position (AHP), the relative AHP relative to a target object;
        determine an absolute AHP, the absolute AHP relative to a datum;
        determine an aircraft trajectory based on the absolute AHP over time;
        compare one of: the relative AHP and the absolute AHP to a desired position;
        determine at least one deviation between one of: 1) the absolute AHP and the desired position, 2) the aircraft trajectory and a desired trajectory, and 3) the relative AHP and the target object;
        determine a correction to reduce the at least one deviation; and
        command the autopilot to perform the correction.

2. The hybrid positioning and guidance system of claim 1, wherein the avionics suite further comprises at least one of an Inertial Reference System (IRS), a Global Positioning System (GPS), an Instrument Landing System (ILS), and a Radio Altimeter (RA).

3. The hybrid positioning and guidance system of claim 1, wherein determine at least one deviation between the aircraft trajectory and a desired trajectory further comprises:
    determine a groundspeed of the aircraft based on the sensor data;
    determine a deviation between the groundspeed and an assigned speed;
    determine a correction to reduce the deviation; and
    command the autopilot to apply the correction.

4. The hybrid positioning and guidance system of claim 1, wherein compare one of: the relative AHP and the absolute AHP to a desired position further includes:
    determine a monitor AHP, the monitor AHP separate from each of the relative AHP and the absolute AHP; and
    compare the monitor AHP to one of the relative AHP and the absolute AHP; and
    alert an operator if the compare results in a deviation greater than a threshold.

5. The hybrid positioning and guidance system of claim 1, further including an integrated flight management system (FMS) configured to:
    compare the absolute AHP to a desired position;
    determine at least one deviation between one of 1) the absolute AHP and the desired position, 2) the aircraft trajectory and a desired trajectory, and 3) the relative AHP and the target object;
    determine a correction to reduce the at least one deviation; and
    command the autopilot to perform the correction.

6. The hybrid positioning and guidance system of claim 1, wherein the at least one attribute of a sensed object further comprises one of a shape, a three-dimensional position relative to the datum, a size, a texture, a reflectivity level, a frequency, a wavelength, a temperature, an emissivity, a bandwidth a radar cross section, and a color.

7. The hybrid positioning and guidance system of claim 1, wherein the sensed object includes a terrain object, a geographical object, a natural object, a man-made object, an airport prepared surface, and a landing surface.

8. The hybrid positioning and guidance system of claim 1, wherein identification of the sensed object based on the comparison further comprises a comparison of the sensed at least one attribute with the historical object data, the comparison including a percentage based threshold match of a totality of object attributes.

9. The hybrid positioning and guidance system of claim 1, wherein the target object further includes one of a landing surface, a flight deck, an aircraft, a target of interest, and wherein the trajectory further includes one of a taxi segment, a takeoff segment, a departure procedure, a cruise course, a localizer course, a glide path, an arrival procedure, an initial approach segment, a final approach segment, and a landing segment.

10. The hybrid positioning and guidance system of claim 1, wherein the datum includes a vertical geodetic reference datum and a horizontal geodetic reference datum.

11. A method for guidance deviation derivation from high assurance hybrid positioning, comprising:
   receiving sensor data from at least one sensor of a sensor suite, the sensor data including at least one attribute of a sensed object;
   storing the received sensor data in an onboard database, the onboard database including historical object data;
   comparing the received sensor data to the historical object data;
   identifying the sensed object based on the comparison;
   determining if the at least one attribute of the sensed object is in the onboard database;
   updating a partition of the onboard database with the at least one attribute of the sensed object if the at least one attribute of the sensed object is not within the historical object data; and
   determining a relative aircraft hybrid position (AHP) and an absolute AHP, the relative AHP relative to a target object, the absolute AHP relative to a datum, the absolute AHP including a three-dimensional coordinate plus time;
   comparing one of: the relative AHP and the absolute AHP to a desired position;
   determining an aircraft trajectory based on the absolute AHP over time;
   determine at least one deviation between one of: 1) the absolute AHP and the desired position, 2) the aircraft trajectory and a desired trajectory, and 3) the relative AHP and the target object;
   determining a correction to reduce the at least one deviation; and
   commanding an autopilot to perform the correction.

12. The method for guidance deviation derivation from high assurance hybrid positioning of claim 11, wherein comparing the received sensor data to the historical object data further includes an analysis of the at least one attribute associated with the sensed object.

13. The method for guidance deviation derivation from high assurance hybrid positioning of claim 11, wherein updating the onboard database with the at least one attribute of the sensed object further includes:
   updating the partition of the onboard database with a sensed object not currently within the onboard database;
   flagging the at least one attribute for a post flight analysis and update; and
   sharing the updated partition of the onboard database offboard the aircraft.

14. The method for guidance deviation derivation from high assurance hybrid positioning of claim 11, wherein receiving sensor data from at least one sensor of a sensor suite further comprises a phase of flight analysis and a determination of a sensor hierarchy, each based on at least one of an altitude, a mission, a speed, and a sensor fidelity.

15. The method for guidance deviation derivation from high assurance hybrid positioning of claim 11, wherein determining a relative AHP further comprises a bearing, range, altitude and closure velocity relative to the target object.

16. The method for guidance deviation derivation from high assurance hybrid positioning of claim 11, wherein receiving sensor data from at least one sensor of a sensor suite further comprises passively receiving sensor data.

17. The method for guidance deviation derivation from high assurance hybrid positioning of claim 11, wherein determining at least one deviation between the aircraft trajectory and a desired trajectory further comprises:
   determine a groundspeed of the aircraft based on the sensor data;
   determine a deviation between the groundspeed and an assigned speed;
   determine a correction to reduce the deviation; and
   command the autopilot to apply the correction.

18. The method for guidance deviation derivation from high assurance hybrid positioning of claim 11, wherein an integrated flight management system (FMS) is configured for:
   comparing the absolute AHP to a desired position;
   determining at least one deviation 1) between the absolute AHP and the desired position, 2) between the aircraft trajectory and a desired trajectory, and 3) between the relative AHP and the target object;
   determining a correction to reduce the at least one deviation; and
   commanding the autopilot to perform the correction.

19. The method for guidance deviation derivation from high assurance hybrid positioning of claim 11, wherein the at least one attribute of a sensed object further comprises a shape, a three-dimensional position relative to the datum, a size, a texture, a reflectivity level, and a color.

20. The method for guidance deviation derivation from high assurance hybrid positioning of claim 11, wherein the target object further includes one of a landing surface, a flight deck, an aircraft, and a target of interest, and wherein the trajectory further includes a taxi segment, a takeoff segment, a departure procedure, a cruise course, a localizer course, a glide path, an arrival procedure, an initial approach segment, a final approach segment, a landing segment.

* * * * *